United States Patent
Kim et al.

(10) Patent No.: US 12,363,528 B2
(45) Date of Patent: Jul. 15, 2025

(54) METHOD AND APPARATUS FOR REVOKING USER EQUIPMENT AUTHENTICATION IN WIRELESS COMMUNICATION SYSTEM

(71) Applicant: LG ELECTRONICS INC., Seoul (KR)

(72) Inventors: Dongjoo Kim, Seoul (KR); Laeyoung Kim, Seoul (KR); Anbin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 17/967,456

(22) Filed: Oct. 17, 2022

(65) Prior Publication Data

US 2023/0224702 A1    Jul. 13, 2023

(30) Foreign Application Priority Data

Jan. 7, 2022  (KR) .................. 10-2022-0002893

(51) Int. Cl.
*H04W 12/082* (2021.01)
*H04W 12/06* (2021.01)

(52) U.S. Cl.
CPC .................. *H04W 12/06* (2013.01)

(58) Field of Classification Search
CPC ..... H04W 12/06; H04W 88/14; H04W 76/32; H04W 88/04; H04W 92/18; H04W 12/082; H04W 76/14; H04W 76/30; H04L 63/0892

See application file for complete search history.

(56) References Cited

U.S. PATENT DOCUMENTS

| 2021/0045021 A1* | 2/2021 | Jeong ............... H04W 36/0033 |
| 2021/0185531 A1* | 6/2021 | Avetisov ............... H04L 63/18 |
| 2022/0248497 A1* | 8/2022 | Tamura ............... H04W 12/08 |
| 2024/0305980 A1* | 9/2024 | Ferdi ..................... H04W 76/14 |

FOREIGN PATENT DOCUMENTS

| WO | 2020225600 | 11/2020 |
| WO | 2021254353 | 12/2021 |

OTHER PUBLICATIONS

European Patent Office Application Serial No. 22196214.5, Search Report dated May 11, 2023, 8 pages.
3rd Generation Partnership Project (3GPP), "Technical Specification Group Services and System Aspects; Study on security aspects of enhancement for proximity based services in the 5G System (5GS) (Release 17)," 3GPP TR 33.847 V17.0.0, Dec. 2021, 162 pages.

* cited by examiner

*Primary Examiner* — Ali S Abyaneh
(74) *Attorney, Agent, or Firm* — LEE, HONG, DEGERMAN, KANG & WAIMEY

(57) ABSTRACT

A method for discarding authentication of a user equipment in a wireless communication system, including: determining, by a network, authentication revocation of a first remote user equipment; determining whether or not a PDU session of a relay user equipment, which is used by the first remote user equipment, is used by another remote user equipment; and transmitting, to the relay user equipment, a release request for the PDU session of the relay user equipment or a release request for a PC5 link of the first remote user equipment.

12 Claims, 21 Drawing Sheets

METHOD AND APPARATUS FOR REVOKING USER EQUIPMENT AUTHENTICATION IN WIRELESS COMMUNICATION SYSTEM

CROSS-REFERENCE TO RELATED APPLICATION(S)

Pursuant to 35 U.S.C. § 119(a), this application claims the benefit of earlier filing date and right of priority to Korean Patent Application No. 10-2022-0002893, filed on Jan. 7, 2022, the contents of which are hereby incorporated by reference herein in its entirety.

BACKGROUND OF THE INVENTION

Field of the Invention

The present disclosure relates to a wireless communication system, that is, to a method for revoking authentication of a user equipment. More particularly, the present disclosure relates to a method for revoking secondary authentication of a remote user equipment (UE) that performs communication with a core network based on UE-network relay.

Description of the Related Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure may provide a method and apparatus for revoking authentication of a user equipment in a wireless communication system.

The present disclosure may provide a method and apparatus for revoking authentication for a remote user equipment (UE) that performs communication with a core network through a relay UE based on UE-network relay in a wireless communication system.

The present disclosure may provide a method and apparatus for determining whether or not to maintain a packet data unit (PDU) session of a relay UE, in case of revoking secondary authentication for a remote UE in a wireless communication system.

The present disclosure may provide a method and apparatus for determining a subject determining whether or not to maintain a PDU session of a relay UE based on revocation of secondary authentication for a remote UE in a wireless communication system.

The technical objects to be achieved in the present disclosure are not limited to the above-mentioned technical objects, and other technical objects that are not mentioned may be considered by those skilled in the art through the embodiments described below.

The present disclosure may provide a method for discarding authentication of a user equipment in a wireless communication system, the method comprising: determining, by a network, revocation of authentication of a first remote user equipment, determining whether another remote user equipment uses a packet data unit (PDU) session of a relay user equipment, which the first remote user equipment is using, and transmitting a release request for a PDU session of a relay user equipment or a release request for a PC5 link of the first remote user equipment to the relay user equipment.

The present disclosure may provide based on the PDU session of the relay user equipment being used only by the first remote user equipment, but not by the another remote user equipment, the network transmits, to the relay user equipment, the release request for the PDU session of the relay user equipment.

The present disclosure may provide based on the PDU session of the relay user equipment being used not only by the first remote user equipment but also by the another remote user equipment, the network transmits the release request for the PC5 link of the first remote user equipment.

The present disclosure may provide the revocation of authentication of the first remote user equipment is determined by a session management function (SMF) or data network-authentication, authorization and accounting (DN-AAA).

The present disclosure may provide based on the revocation of authentication of the first remote user equipment being determined based on the DN-AAA, the SMF receives an authentication revocation request message for the first remote user equipment from the DN-AAA.

The present disclosure may provide based on the network performing authentication for at least one remote user equipment through the relay user equipment, the network obtains identification information and relevant information on each of the at least one remote user equipment through the relay user equipment.

The present disclosure may provide the network determines whether or not the another remote user equipment different from the first remote user equipment uses the PDU session of the relay user equipment, based on the identification information and the relevant information on the each of the at least one remote user equipment.

The present disclosure may provide based on the network transmitting the release request for the PDU session of the relay user equipment, the release request for the PDU session of the relay user equipment includes a release cause value, and wherein the release cause value indicates authentication revocation for the first remote user equipment.

The present disclosure may provide based on the release request for the PDU session of the relay user equipment, the relay user equipment performs a procedure of releasing the PC5 link with the first remote user equipment, releases the PDU session and reports PDU session release completion to the network.

The present disclosure may provide based on the network transmitting the release request for the PC5 link of the first remote user equipment to the relay user equipment, the release request for the PC5 link of the first remote user equipment includes identification information of the first remote user equipment and a release cause value indicating the authentication revocation of the first remote user equipment.

The present disclosure may provide the relay user equipment performs a procedure for releasing the PC5 link with the first remote user equipment based on the identification information of the first remote user equipment and reports PC5 link release completion of the first remote user equipment to the network.

The present disclosure may provide a network operating in a wireless communication system, the network comprising, at least one transceiver, at least one processor and at least one memory coupled with the at least one processor in an operable manner and configured, when operated, to store instructions for the at least one processor to implement a specific operation, wherein the specific operation is configured to: determine authentication revocation of a first remote user equipment, determine whether another remote user equipment uses a PDU session of a relay user equipment, which the first remote user equipment is using, and control the transceiver to transmit a release request for the PDU session of the relay user equipment or a release request for a PC5 link of the first remote user equipment to a relay user equipment.

The present disclosure may provide a method for performing authentication discarding of a user equipment in a wireless communication system, the method comprising: receiving, from a network, a release request for a PDU session of a relay user equipment or a release request for a PC5 link of a first remote user equipment, and performing a procedure of releasing the PC5 link with the first remote user equipment based on the release request for the PDU session of the relay user equipment or the release request for the PC5 link of the first remote user equipment, wherein authentication revocation of the first remote user equipment is determined based on the network, and wherein the release request for the PDU session of the relay user equipment or the release request for the PC5 link of the first remote user equipment is received based on whether or not another remote user equipment uses the PDU session of the relay user equipment, which the first remote user equipment is using.

The present disclosure may provide a relay user equipment operating in a wireless communication system, the relay user equipment comprising: at least one transceiver, at least one processor, and at least one memory coupled with the at least one processor in an operable manner and configured, when operated, to store instructions for the at least one processor to implement a specific operation, wherein the specific operation is configured to: control the transceiver to receive, from a network, a release request for a PDU session of a relay user equipment or a release request for a PC5 link of a first remote user equipment, and perform a procedure of releasing the PC5 link with the first remote user equipment based on the release request for the PDU session of the relay user equipment or the release request for the PC5 link of the first remote user equipment, and wherein authentication revocation of the first remote user equipment is determined based on the network, and the release request for the PDU session of the relay user equipment or the release request for the PC5 link of the first remote user equipment is received based on whether or not another remote user equipment uses the PDU session of the relay user equipment, which the first remote user equipment is using.

The present disclosure may provide a method for revoking authentication of a UE in a wireless communication system.

The present disclosure may provide a method for revoking authentication for a remote UE that performs communication with a core network through a relay UE based on UE-network relay in a wireless communication system.

The present disclosure may provide a method for maintaining a relay service of another remote UE using a PDU session of a relay UE, in case of revoking secondary authentication for a remote UE in a wireless communication system.

The technical objects to be achieved in the present disclosure are not limited to the above-mentioned technical objects, and other technical objects that are not mentioned may be considered by those skilled in the art through the embodiments described below.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION OF THE INVENTION

Figure 1:
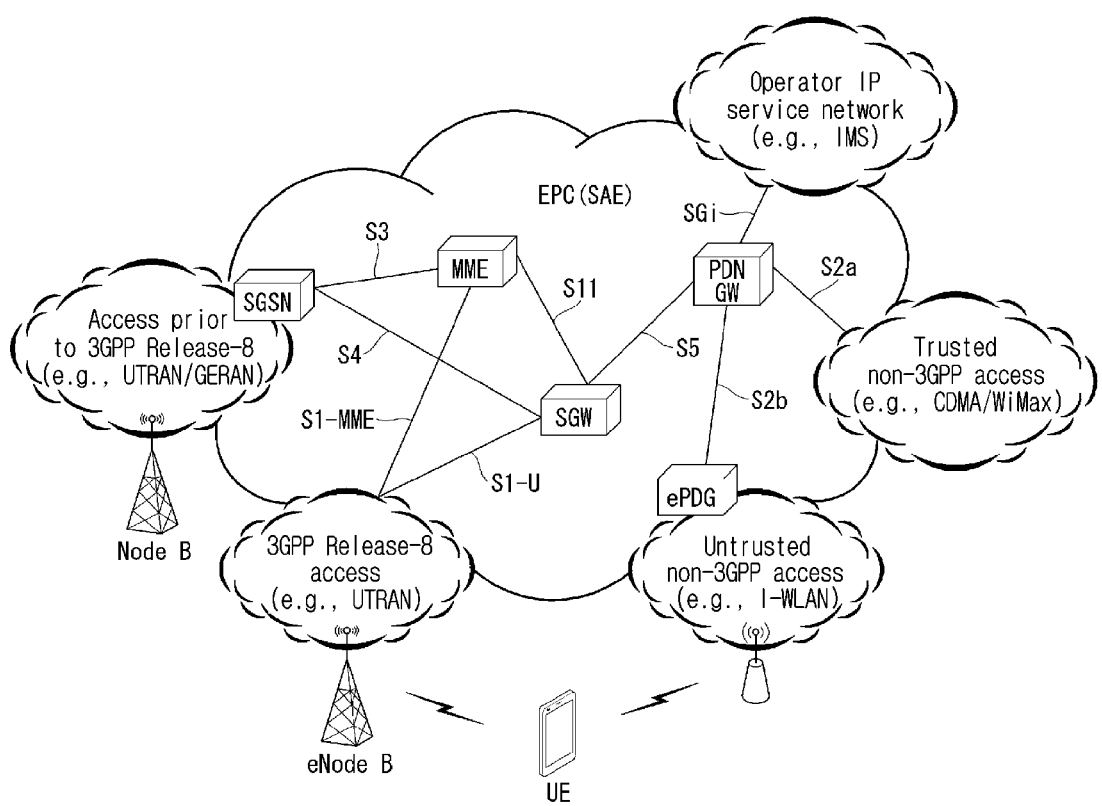
FIG. 1 is a view illustrating various reference points.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B(eNB)", "gNode B(gNB)", "ng-eNB", "advanced base station(ABS)", or "access point".

Also, in the embodiments of the present disclosure, "terminal" may be replaced by such terms as "user equipment (UE)", "mobile station(MS)", "subscriber station(SS)", "mobile subscriber station(MSS)", "mobile terminal" or "advanced mobile station(AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

For clarity of explanation, the descriptions below are based on a 3GPP communication system (e.g. LTE, NR and the like), but the technical idea of the present disclosure is not limited thereto. LTE may mean a technology after 3GPP TS 36.xxx Release 8. Specifically, the LTE technology after 3GPP TS 36.xxx Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx' means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

For terms, abbreviations, and other backgrounds that may be used in this document, reference may be made to the following standard document descriptions published prior to this document. In particular, terms, abbreviations, and other background technologies related to LTE/EPS (Evolved Packet System) may refer to 36.xxx series, 23.xxx series, and 24.xxx series, and NR (new radio)/5GS related terms and abbreviations and other backgrounds may refer to the 38.xxx series, 23.xxx series and 24.xxx series.

3GPP LTE/EPS
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.306: User Equipment (UE) radio access capabilities
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 36.413: S1 Application Protocol (S1AP)
3GPP TS 36.423: X2 Application Protocol (X2AP)
3GPPP TS 22.125: Unmanned Aerial System support in 3GPP; Stage 1
3GPP TS 23.303: Proximity-based services (Prose); Stage 2
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3

3GPP NR/5GS
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.501: System Architecture for the 5G System
3GPP TS 23.502: Procedures for the 5G System
3GPP TS 23.503: Policy and Charging Control Framework for the 5G System;
Stage 2
3GPP TS 24.501: Non-Access-Stratum (NAS) protocol for 5G System (5GS);
Stage 3
3GPP TS 24.502: Access to the 3GPP 5G Core Network (5GCN) via non-3GPP access networks
3GPP TS 24.526: User Equipment (UE) policies for 5G System (5GS); Stage 3

3GPP V2X
3GPP TS 23.285: Architecture enhancements for V2X services
3GPP TR 23.786: Evolved Packet System (EPS) and the 5G System (5GS) to support advanced V2X services
3GPP TS 23.287: Architecture enhancements for 5G System (5GS) to support Vehicle-to-Everything (V2X) services
3GPP TS 24.587: Vehicle-to-Everything (V2X) services in 5G System (5GS); Protocol aspects; Stage 3
3GPP TS 24.588: Vehicle-to-Everything (V2X) services in 5G System (5GS); User Equipment (UE) policies; Stage 3

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 1 illustrates various reference points.

An example of the network structure of FIG. 1 discloses an LTE/EPS-based network structure, and may operate with reference to matters described in standard documents published before this document. In the network structure of FIG. 1, at least one of SGW, PDN GW, MME, SGSN, and ePDG entities may operate with reference to matters described in standard documents published before this document. In addition, S1-MME, S1-U, S2a, S2b, S3, S4, S5, S11, and SGi may exist as interfaces between each entity, which are described in the standard document published before this document. can do. In addition, other entities and interfaces may be configured with reference to matters described in standard documents published before this document described above, and are not limited to specific forms.

Figure 2:
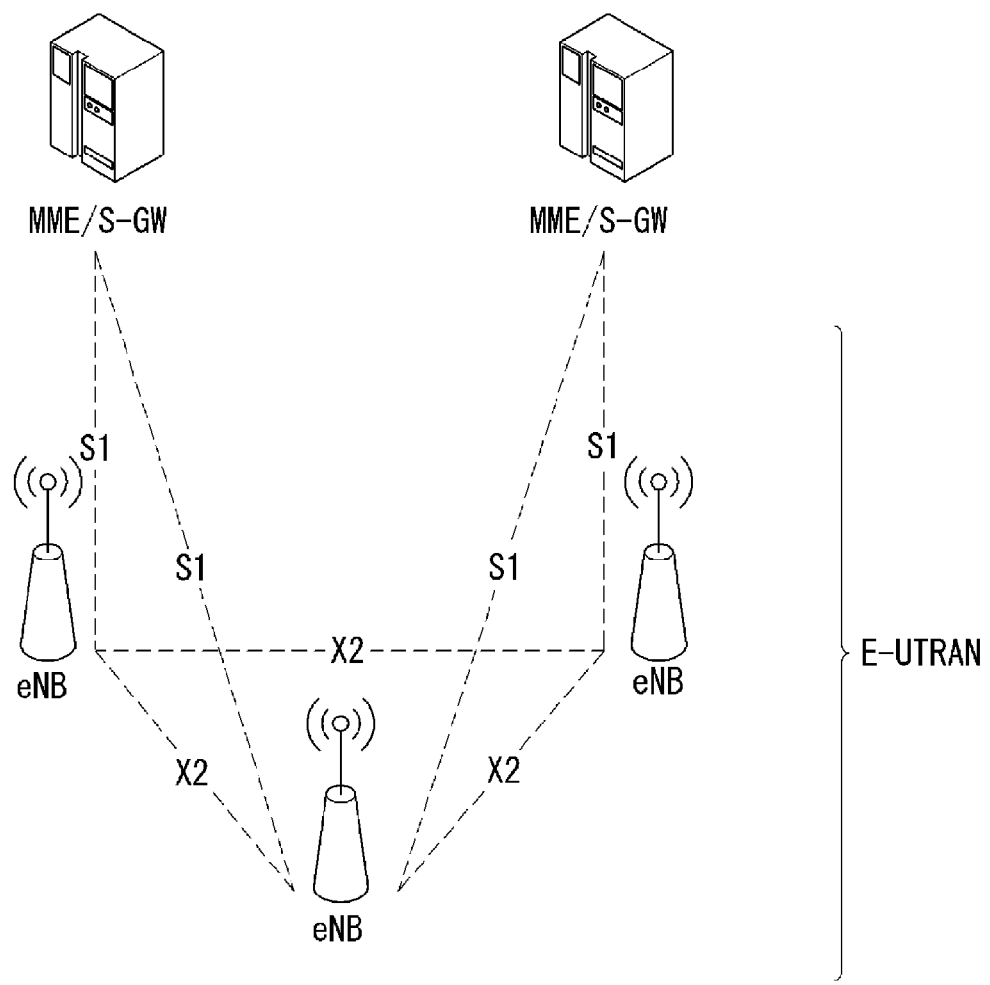
FIG. 2 is a view illustrating an example of a network structure of an evolved universal terrestrial radio access network (E-UTRAN) to which the present disclosure is applicable.

FIG. 2 illustrates an example of a network structure of an evolved universal terrestrial radio access network (E-UTRAN) to which the present disclosure is applicable. An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 2, an E-UMTS network includes an E-UTRAN, an EPC, and one or more UEs. The E-UTRAN consists of eNBs that provide control plane and user plane protocols to the UE, and the eNBs are interconnected with each other by means of the X2 interface, and reference may be made to matters described in standard documents published before this document.

Figure 3:
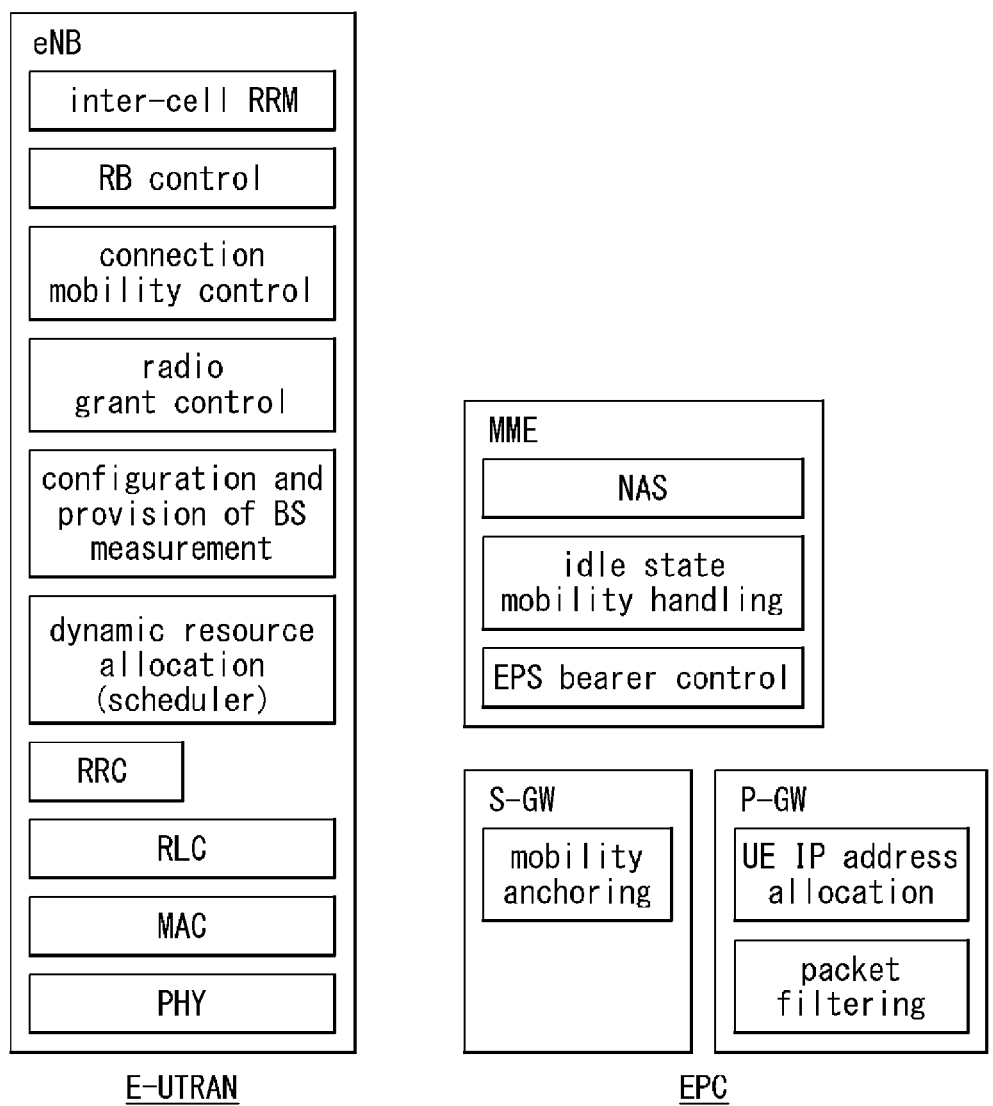
FIG. 3 is a view illustrating a general E-URTAN and an example of an architecture of an evolved packet core (EPC).

FIG. 3 is a view illustrating a general E-URTAN and an example of an architecture of an evolved packet core (EPC).

As illustrated in FIG. 3, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures combining 5G and 4G. And 3GPP TS 23.501 shows an architecture using NR and NGC.

Figure 4:
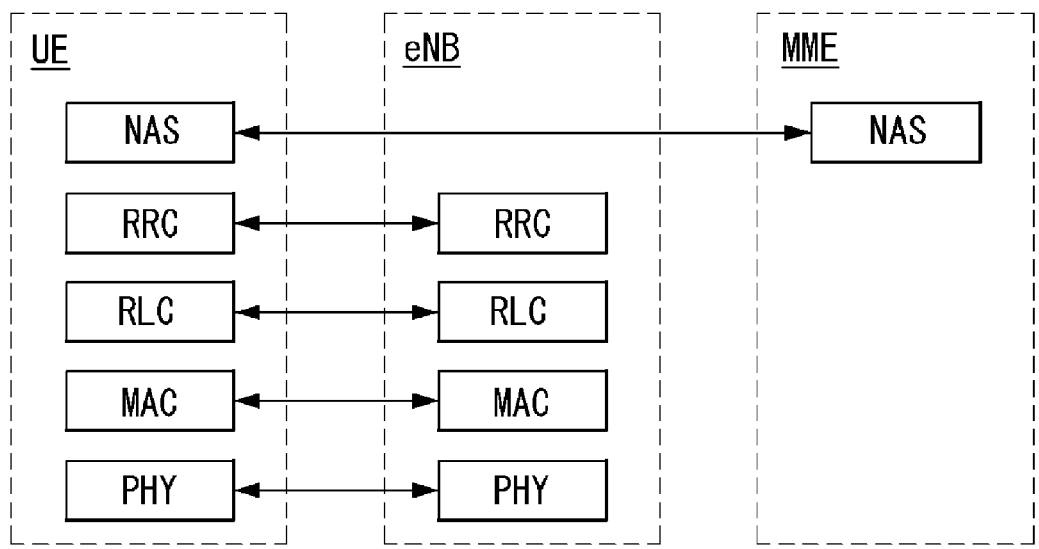
FIG. 4 is a view illustrating an example of a structure of a radio interface protocol in a control plane between user equipment (UE) and evolved node B (eNB).
Figure 5:
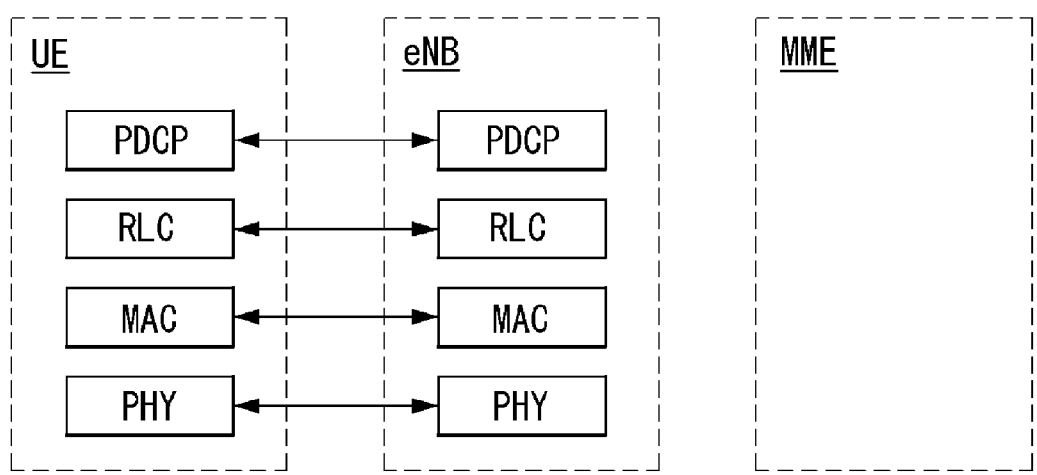
FIG. 5 is a view illustrating an example of a structure of a radio interface protocol in a user plane between UE and eNB.

FIG. 4 is a view illustrating an example of a structure of a radio interface protocol in a control plane between user equipment (UE) and evolved node B (eNB), and FIG. 5 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems, and it is possible to refer to the matters described in the standard document published before this document described above.

Figure 6:
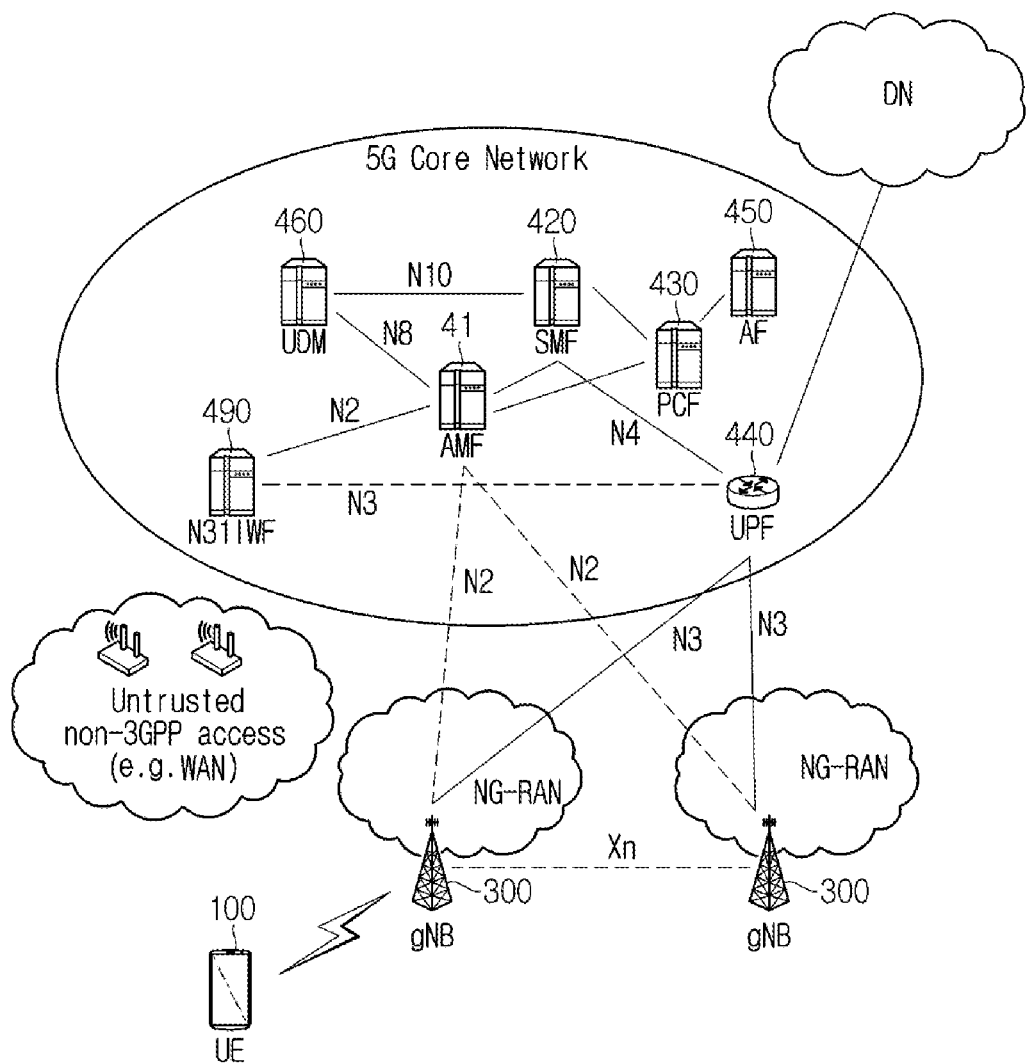
FIG. 6 is a view illustrating an example of an architecture of a general new radio (NR)-radio access network (RAN).

FIG. 6 is a view illustrating an example of a wireless communication system that is applied to the present disclosure.

5GC (5G Core) may include various components, part of which are shown in FIG. 6, including an access and mobility management function (AMF) 410, a session management function (SMF) 420, a policy control function (PCF) 430, a Prose user plane function (UPF) 440, an application function (AF) 450, unified data management (UDM) 460, and a non-3GPP interworking function (N3IWF) 490.

A UE 100 is connected to a data network via the UPF 440 through a next generation radio access network (NG-RAN) including the gNB 300. The UE 100 may be provided with a data service even through untrusted non-3GPP access, e.g., a wireless local area network (WLAN). In order to connect the non-3GPP access to a core network, the N3IWF 490 may be deployed.

The N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The AMF 410 may manage access and mobility in the 5G system. The AMF 410 may perform a function of managing (non-access stratum) NAS security. The AMF 410 may perform a function of handling mobility in an idle state.

The UPF 440 performs a function of gateway for transmitting and receiving user data. The UPF node 440 may perform the entirety or a portion of a user plane function of a serving gateway (S-GW) and a packet data network gateway (P-GW) of 4G mobile communication.

The UPF 440 is a component that operates as a boundary point between a next generation radio access network (NG-RAN) and the core network and maintains a data path between the gNB 300 and the SMF 420. In addition, when the UE 100 moves over an area served by the gNB 300, the UPF 440 serves as a mobility anchor point. The UPF 440 may perform a function of handling a PDU. For mobility within the NG-RAN (which is defined after 3GPP Release-15), the UPF 440 may route packets. In addition, the UPF 440 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE)

RAN. The UPF 440 may correspond to a termination point of a data interface toward the data network.

The PCF 430 is a node that controls an operator's policy. The AF 450 is a server for providing various services to the UE 100. The UDM 460 is a server that manages subscriber information, such as home subscriber server (HSS) of 4G mobile communication. The UDM 460 stores and manages the subscriber information in a unified data repository (UDR).

The SMF 420 may perform a function of allocating an Internet protocol (IP) address of the UE 100. In addition, the SMF 420 may control a packet data unit (PDU) session.

For convenience of explanation, hereinafter, reference numerals may be omitted for AMF 410, SMF 420, PCF 430, UPF 440, AF 450, UDM 460, N3IWF 490, gNB 300, or UE 100, which may operate with reference to contents described in standard documents released earlier than the present document.

Figure 7:
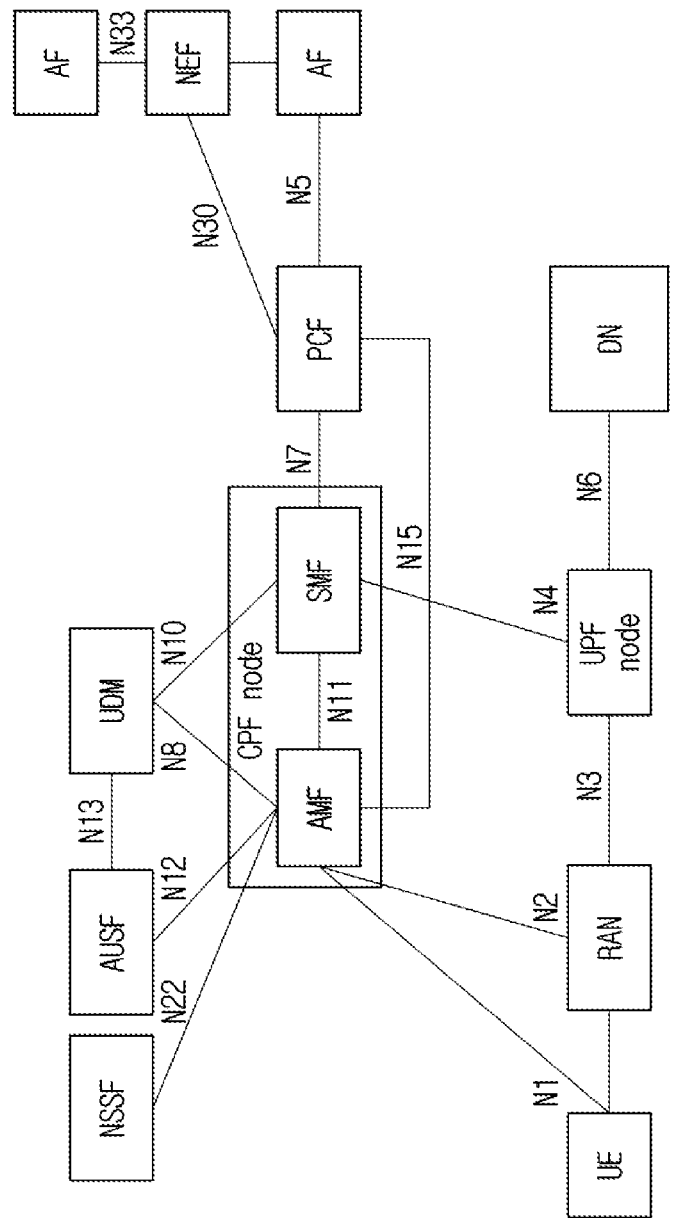
FIG. 7 is a view illustrating an example of functional separation of a general NG-RAN and a 5th generation core (5GC).

FIG. 7 is a view illustrating an example expressing a structure of a wireless communication system, which is applied to the present disclosure, from a node perspective.

Referring to FIG. 7, a UE is connected to a data network (DN) through a next generation RAN. A control plane function (CPF) node performs all or a part of the functions of a mobility management entity (MME) of 4G mobile communication and all or a part of serving gateway (S-GW) and PDN gateway (P-GW) functions. The CPF node includes AMF and SMF.

A UPF node performs a function of a gateway in which data of a user is transmitted and received.

An authentication server function (AUSF) authenticates and manages a UE. A network slice selection function (NSSF) is a node for network slicing described below.

A network exposure function (NEF) provides a mechanism that safely opens the service and function of 5G core.

Reference points in FIG. 7 are described as follows. N1 represents a reference point between UE and AMF. N2 represents a reference point between (R)AN and AMF. N3 represents a reference point between (R)AN and UPF. N4 represents a reference point between SMF and UPF. N5 represents a reference point between PCF and AF. N6 represents a reference point between UPF and DN. N7 represents a reference point between SMF and PCF. N8 represents a reference point between UDM and AMF. N9 represents a reference point between UPFs. N10 represents a reference point between UDM and SMF. N11 represents a reference point between AMF and SMF. N12 represents a reference point between AMF and AUSF. N13 represents a reference point between UDM and AUSF. N14 represents a reference point between AMFs. N15 represents a reference point between PCF and AMF in a non-roaming scenario and a reference point between AMF and PCF of a visited network in a roaming scenario. N16 represents a reference point between SMFs. N22 represents a reference point between AMF and NSSF. N30 represents a reference point between PCF and NEF. N33 may represent a reference point between AF and NEF, and the above-described entity and interface may be configured with reference to contents described in standard documents released earlier than the present document.

A radio interface protocol is based on the 3GPP radio access network standard. The radio interface protocol is horizontally divided into a physical layer, a data link layer, and a network layer, and is vertically divided into a user plane for transmission of data information and a control plane for transfer of control signal (signaling).

The protocol layers may be divided into L1 (layer-1), L2 (layer-2), and L3 (layer-3) based on the three lower layers of the open system interconnection (OSI) reference model widely known in communication systems.

Figure 8:
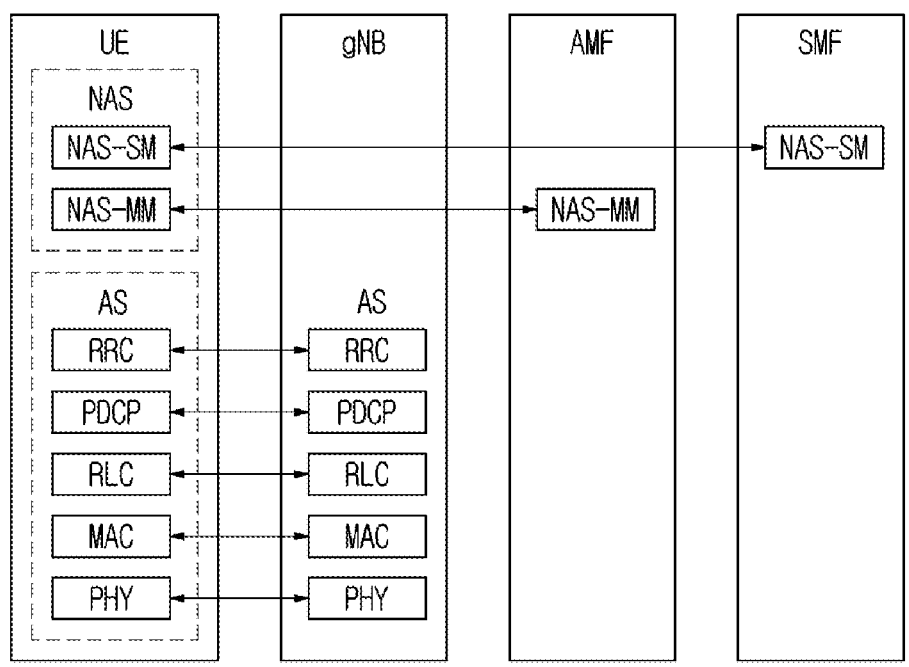
FIG. 8 is a view illustrating an example of a general architecture of a 5th generation (5G) system.

Hereinafter, the present disclosure will describe each layer of a radio protocol. FIG. 8 is a view illustrating an example of a radio interface protocol between UE and gBN.

Referring to FIG. 8, an access stratum (AS) layer may include a physical (PHY) layer, a medium access control layer, a radio link control (RLC) layer, a packet data convergence protocol (PDCP) layer, and a radio resource control (RRC) layer, and an operation based on each layer may be performed with reference to contents described standard documents released earlier than the present document.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Communication System Applicable to the Present Disclosure

Figure 9:
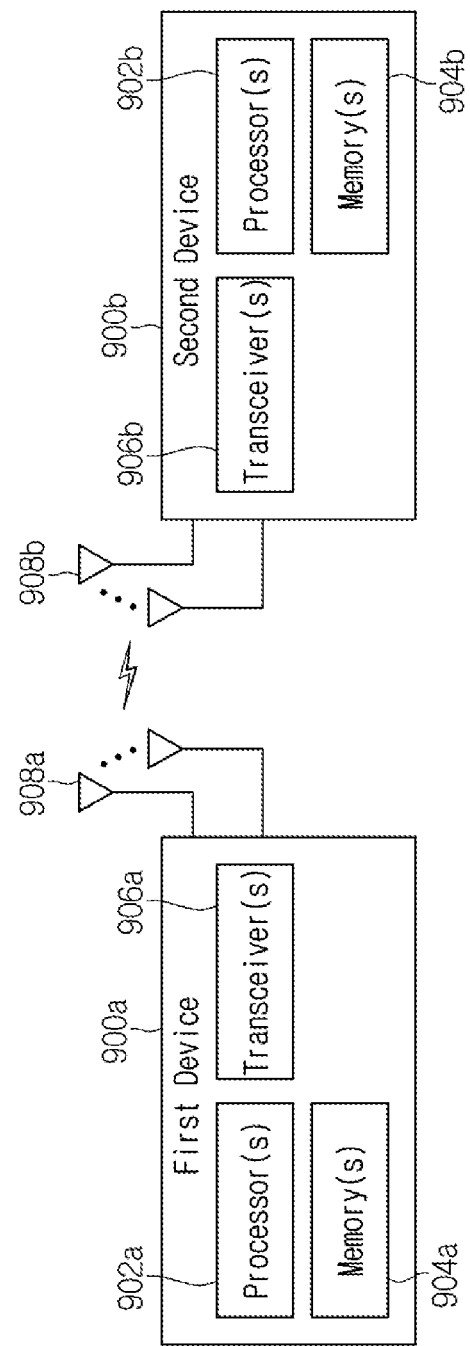
FIG. 9 is a view illustrating an example of a wireless device applicable to the present disclosure.

FIG. 9 is a view showing an example of a wireless device applicable to the present disclosure.

Referring to FIG. 9, a first wireless device 900*a* and a second wireless device 900*b* may transmit and receive radio signals through various radio access technologies (e.g., LTE or NR). Here, {the first wireless device 900*a*, the second wireless device 900*b*} may correspond to {the wireless device 100*x*, the base station 90} and/or {the wireless device 100*x*, the wireless device 100*x*}.

The first wireless device 900*a* may include one or more processors 902*a* and one or more memories 904*a* and may further include one or more transceivers 906*a* and/or one or more antennas 908*a*. The processor 902*a* may be configured to control the memory 904*a* and/or the transceiver 906*a* and to implement descriptions, functions, procedures, proposals, methods and/or operational flowcharts disclosed herein. For example, the processor 902*a* may process information in the memory 904*a* to generate first information/signal and then transmit a radio signal including the first information/signal through the transceiver 906*a*. In addition, the processor 902*a* may receive a radio signal including second information/signal through the transceiver 906*a* and then store information obtained from signal processing of the second information/signal in the memory 904*a*. The memory 904*a* may be coupled with the processor 902*a*, and store a variety of information related to operation of the processor 902*a*. For example, the memory 904*a* may store software code including instructions for performing all or some of the processes controlled by the processor 902*a* or performing the descriptions, functions, procedures, proposals, methods and/or operational flowcharts disclosed herein. Here, the processor 902*a* and the memory 904*a* may be part of a communication modem/circuit/chip designed to implement wireless communication technology (e.g., LTE or NR). The transceiver 906*a* may be coupled with the processor 902*a* to transmit and/or receive radio signals through one or more antennas 908*a*. The transceiver 906*a* may include a transmitter and/or a receiver. The transceiver 906*a* may be used interchangeably with a radio frequency (RF) unit. In the present disclosure, the wireless device may refer to a communication modem/circuit/chip.

The second wireless device 900b may include one or more processors 902b and one or more memories 904b and may further include one or more transceivers 906b and/or one or more antennas 908b. The processor 902b may be configured to control the memory 904b and/or the transceiver 906b and to implement the descriptions, functions, procedures, proposals, methods and/or operational flowcharts disclosed herein. For example, the processor 902b may process information in the memory 904b to generate third information/signal and then transmit the third information/signal through the transceiver 906b. In addition, the processor 902b may receive a radio signal including fourth information/signal through the transceiver 906b and then store information obtained from signal processing of the fourth information/signal in the memory 904b. The memory 904b may be coupled with the processor 902b to store a variety of information related to operation of the processor 902b. For example, the memory 904b may store software code including instructions for performing all or some of the processes controlled by the processor 902b or performing the descriptions, functions, procedures, proposals, methods and/or operational flowcharts disclosed herein. Herein, the processor 902b and the memory 904b may be part of a communication modem/circuit/chip designed to implement wireless communication technology (e.g., LTE or NR). The transceiver 906b may be coupled with the processor 902b to transmit and/or receive radio signals through one or more antennas 908b. The transceiver 906b may include a transmitter and/or a receiver. The transceiver 906b may be used interchangeably with a radio frequency (RF) unit. In the present disclosure, the wireless device may refer to a communication modem/circuit/chip.

In addition, the structure of a wireless device applicable to the present disclosure is not limited to FIG. 9, and may be configured in various forms. In particular, the present disclosure may be applied to a wireless device that performs an operation for transmitting and/or receiving a wireless signal, and is not limited to a specific form.

As an example, being a function supported based on a ProSe service, ProSe direct discovery may be a process for a user equipment (UE) to discover and recognize another UE adjacent to it based on NR, E-UTRA or WLAN. Herein, there may be two types of ProSe direct discovery: an open type and a restricted type. As an example, the open type may be a type of performing direct discovery without explicit permission for a UE to be discovered. On the other hand, the restricted type may be a type of performing direct discovery only based on explicit permission for a UE to be discovered.

As an example, ProSe direct discovery may be a service that is solely provided to use information on a specific application of a UE that is discovered. The UE may perform an additional operation through information that is obtained through ProSe direct discovery, and thus the service may be provided. In addition, as an example, as non-public safety UEs with a ProSe function, UEs having authority for ProSe direct discovery may perform the ProSe direct discovery function based on NR or E-UTRA in a serving PLMN. Herein, as an example, in case a non-public safety UE loses NR or E-UTRA coverage, the ProSe direct discovery function may not be supported, but the present disclosure is not limited thereto.

In addition, as an example, the ProSe direct discovery may be performed based on Model A or Model B but is not limited thereto. As an example, a UE, which has the ProSe function enabled in Model A, may play any one role of an announcing UE and a monitoring UE. As an example, the announcing UE may be a UE that announces specific information available in another UE that is adjacent and of which discovery is permitted. The monitoring UE may be a UE that monitors specific information announced by the announcing UE. Herein, the announcing UE may broadcast a discovery message during a preset search interval, and the monitoring UE may operate by confirming a message among broadcast messages and then implementing a process. That is, Model A may be a model in which an announcing UE delivers its presence and relevant information through broadcast and a search is performed when a neighbor monitoring UE is interested in the information.

Figure 10:
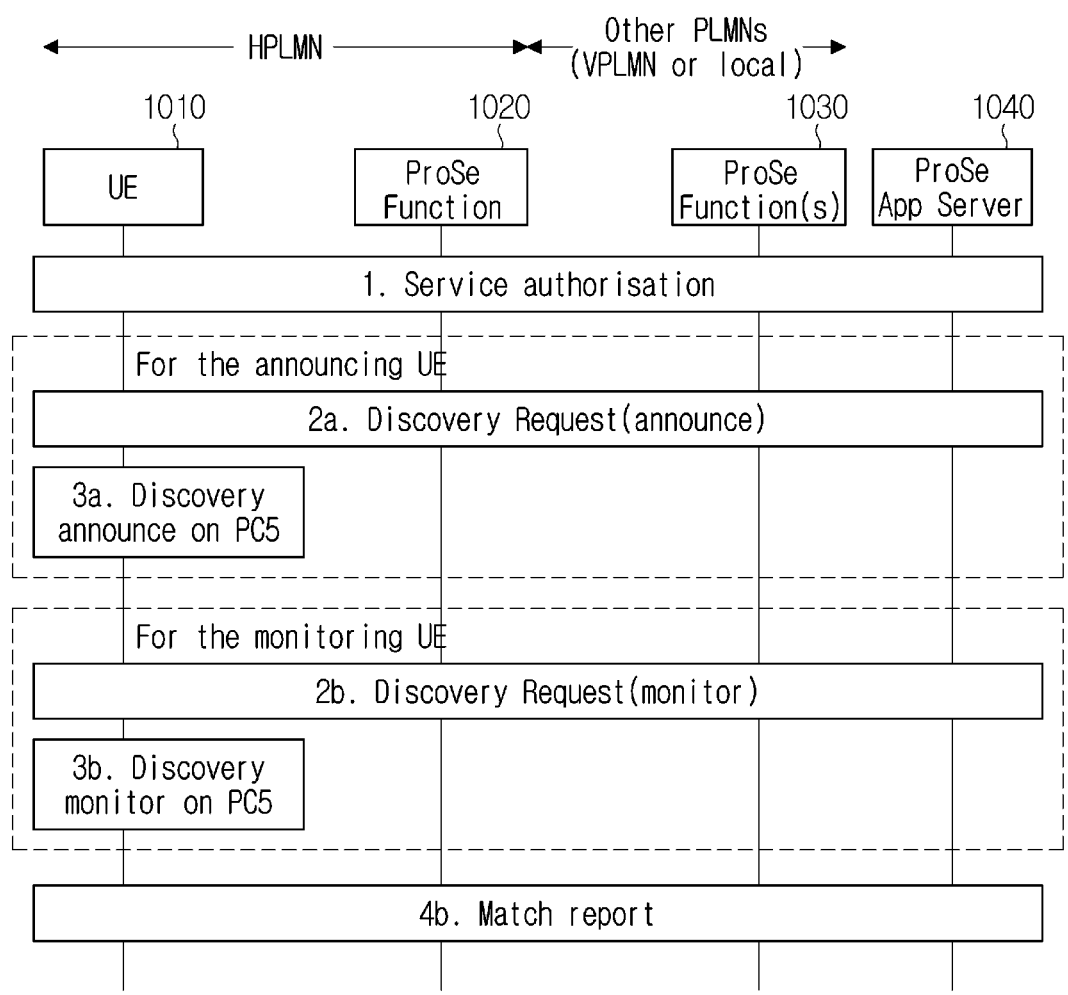
FIG. 10 is a view illustrating a method for performing ProSe direct discovery based on a model A that is applied in the present disclosure.

As a concrete example, FIG. 10 is a view illustrating a method for performing ProSe direct discovery based on Model A that is applied in the present disclosure. Referring to FIG. 10, a UE 1010 may perform service authentication based on ProSe functions 1020 and 1030 and a ProSe application server (ProSe App server) 1040. Next, the UE 1010, which is an announcing UE, may transmit a discovery request message to the ProSe function 1020 and then perform service authentication through the ProSe App server 1040. Next, when authentication is completed, the UE 1010 may perform announcing in a broadcast way. In addition, when the UE 1010 performs monitoring, the UE 1010 may transmit a discovery request message to a monitoring UE through the ProSe function 1020 and then perform service authentication through the ProSe App server 1040. Next, the UE 1010 may monitor an announced message. The UE 1010 may perform service matching based on announcing message monitoring and report matching information to the ProSe function 1020 and the ProSe App server 1040.

On the other hand, Model B may be a model in which ProSe direct discovery is performed in the restricted discovery type as a discoverer UE transmits a restricted discovery message to a discoveree UE. More specifically, a discoverer UE may transmit a request including specific information to be discovered to a discoveree UE. Herein, the discoveree UE may deliver, to the discoverer UE, a response message, which includes relevant information, based on the request message received from the discoverer UE. That is, in Modell B, a discoverer UE may transmit a discovery request message for specific information to a specific discoveree UE and receive a response to the request message, and thus ProSe direct discovery may be performed. As an example, as the public safety discovery is a restricted discovery, a monitoring UE of Model A and a discoverer UE of Model B, which are described above, may need authorization to perform discovery in relation to a specific service, and the ProSe direct discovery may be performed based on this.

Figure 11:
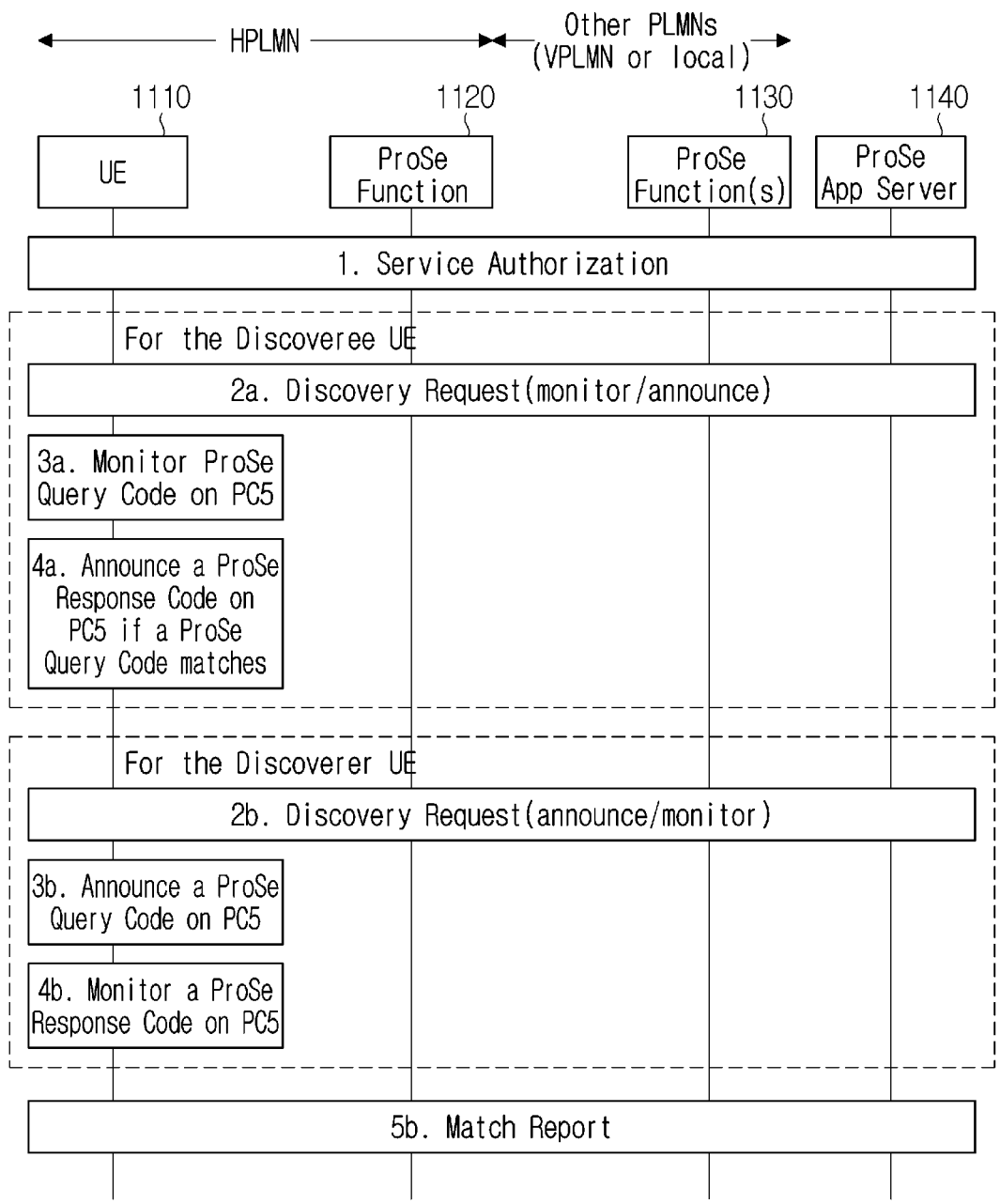
FIG. 11 is a view illustrating a method for performing ProSe direct discovery based on a model B that is applied in the present disclosure.

As a concrete example, FIG. 11 is a view illustrating a method for performing ProSe direct discovery based on Model B that is applied in the present disclosure. Referring to FIG. 11, a UE 1110 may perform service authentication based on ProSe functions 1120 and 1130 and a ProSe application server (ProSe App server) 1140. Next, the UE 1010, which is a discoveree UE, may transmit a discovery request message to the ProSe function 1120 and then perform service authentication through a ProSe App server 1140. Herein, the UE 1110, which is a discoveree UE, may obtain a ProSe response code and a discovery query filter. The UE 1110, which is a discoveree UE, may monitor the ProSe query code through PC5 and, when the ProSe query code is matched, announce a ProSe response code through PC5. Next, the UE 1010, which is a discoverer UE, may transmit a discovery request message to the ProSe function

1120 and then perform service authentication through the ProSe App server 1140. Herein, the UE 1110, which is a discoverer UE, may obtain a discovery response filter, which is composed of a ProSe query code and a ProSe response code, and a ProSe application mask. Next, the UE 1110, which is a discoverer UE, may announce the ProSe query code and complete discovery by monitoring a ProSe response code transmitted by a discoveree UE, thereby performing matching for a corresponding service. Next, the matching information may be reported to the ProSe function 1120 and the ProSe App server 1140.

Based on what is described above, direct communication may be performed. In addition, as an example, a core network of a new communication system (e.g., 5G) may support at least one of ProSe direct discovery, ProSe direct communication, and ProSe UE-to-network relay. Herein, UEs operating based on a ProSe function may perform authentication. In addition, as an example, in UEs operating based on a ProSe function, pre-provisioning may be performed for ProSe direct discovery, ProSe direct communication, and ProSe UE-network relay, and the above-described service may be provided accordingly.

Hereinafter, a method for performing authentication for a ProSe UE-network relay service among the above-described ProSe services and for performing pre-provisioning will be described. As an example, in relation to authentication and provisioning for 5G ProSe UE-network relay, provisioning may be performed with a parameter and a policy with reference to Table 1 but is not limited thereto. In addition, a principle of applying a parameter for 5G ProSe UE-network relay with reference to Table 1 described above may be based on Table 2 and Table 3 but is not limited thereto.

TABLE 1

5.1.4.1 Policy/Parameter provisioning for 5G ProSe UE-to-Network Relay
The following information is provisioned in the UE in support of the UE assuming the role of a ProSe UE-to-Network Relay:
1) Authorisation policy for acting as a 5G ProSe Layer-3 and/or Layer-2 UE-to-Network Relay when "served by NG-RAN":
PLMNs in which the UE is authorized to relay traffic for 5G ProSe Layer-3 and/or Layer-2 Remote UEs.
2) ProSe Relay Discovery policy/parameters for 5G ProSe UE-to-Network Relay:
Includes the parameters that enable the UE to perform 5G ProSe Relay Discovery when provisioned from the PCF in the ME or configured in the UICC:
5G ProSe UE-to-Network Relay Discovery parameters (User Info ID, Relay Service Code(s));
Default Destination Layer-2 ID(s) for sending and receiving initial signaling of discovery messages;
For Layer 3 ProSe UE-to-Network Relay, the PDU Session parameters (PDU Session type, DNN, SSC Mode, S-NSSAI, Access Type Preference) to be used for the relayed traffic for each ProSe Relay Service Code;
Includes security related content for 5G ProSe Relay Discovery for each ProSe Relay Service Code.
Editor's note: Whether the security parameters can be provided by the PCF and details of security parameters will be determined by SA3 WG.
NOTE 1: 5G ProSe Relay Discovery policy/parameters can be provided from ProSe Application Server to the 5G ProSe UE-to-Network Relay.
3) For Layer 3 ProSe UE-to-Network Relay, QoS mapping(s):
Each QoS mapping entry includes:
a mapping between a 5QI value and a PQI value;
a PQI PDB adjustment factor, for the PC5 communication for the UE-to-Network Relay operation;
optional the Relay Service Code(s) associates with the QoS mapping entry.
4) For 5G ProSe Layer 3 UE-to-Network Relay to relay Ethernet or Unstructured traffic from Remote UE by using IP type PDU Session,
Mapping of ProSe Service(s) to ProSe Application Server address information (consisting of IP address/FQDN and transport layer port number).
The following information is provisioned in the UE in support of the UE assuming the role of a Remote UE and thereby enabling the use of a ProSe UE-to-Network Relay:
1) Authorisation policy for using a 5G ProSe Layer-3 and/or L ayer-2 UE-to-Network Relay:
Indicates whether the UE is authorised to use a 5G ProSe Layer-3 and/or Layer-2 UE-to-Network Relay.
2) Policy/parameters for 5G ProSe Relay Discovery:
Includes the parameters for 5G ProSe Relay Discovery and for enabling the UE to connect to the 5G ProSe UE-to-Network Relay after discovery when provisioned from the PCF in the ME or configured in the UICC:
ProSe UE-to-Network Relay Discovery parameters (User Info ID, Relay Service Code(s));
Default Destination Layer-2 ID(s) for sending and receiving initial signaling of discovery messages;
For 5G ProSe Layer 3 UE-to-Network Relay, the PDU Session parameters (PDU Session type, DNN, SSC Mode, S-NSSAI, Access Type Preference) to be used for the relayed traffic for each ProSe Relay Service Code;
Includes security related content for ProSe Relay Discovery for each ProSe Relay Service Codes.
Editor's note: Whether the security parameters can be provided by the PCF and details of security parameters will be determined by SA3 WG.
NOTE 2: ProSe Relay Discovery policy/parameters can be provided from ProSe Application Server to the Remote UE.
The following information is provisioned in the UE in support of the UE assuming the role of a 5G ProSe UE-to-Network Relay as well as in the UE in support of the TABLE 1-continued UE assuming the role of a 5G ProSe Remote UE and thereby enabling the use of a 5G ProSe UE-to-Network Relay:

1) Radio parameters for 5G ProSe Relay Discovery when the UE is not "served by NG-RAN ":

Includes the radio parameters NR PC5 with Geographical Area(s) and an indication of whether they are "operator managed" or "non-operator managed". The UE uses the radio parameters to perform 5G ProSe Direct Discovery over PC5 reference point when "not served by NG-RAN" only if the UE can reliably locate itself in the corresponding Geographical Area. Otherwise, the UE is not authorized to transmit.

2) Radio parameters for 5G ProSe Relay Communication when the UE is not "served by NG-RAN":

Includes the radio parameters NR PC5 with Geographical Area(s) and an indication of whether they are "operator managed" or "non-operator managed". The UE uses the radio parameters to perform 5G ProSe Direct Communication over PC5 reference point when "not served by NG-RAN" only if the UE can reliably locate itself in the corresponding Geographical Area. Otherwise, the UE is not authorized to transmit.

TABLE 2

5.1.4.2 Principles for applying parameters for 5G ProSe UE-to-Network Relay 5.1.4.2.1 Principles for applying parameters for ProSe UE-to-Network Relay discovery For 5G ProSe UE-to-Network Relay discovery over PC5 reference point, the operator may pre-configure the UEs with the required provisioning parameters for 5G ProSe UE-to-Network Relay discovery, without the need for the UEs to connect to the 5GC to get this initial configuration. The following applies:

The provisioning parameters for 5G ProSe UE-to-Network Relay discovery could be from different sources and their priorities are described in clause 5.1.1.

The ME provisioning parameters shall not be erased when a USIM is deselected or replaced.

The UE shall use radio resources for 5G ProSe UE-to-Network Relay discovery as follows:

While a UE has a serving cell and is camped on a cell and the UE intends to use for 5G ProSe UE-to-Network Relay discovery the radio resources (i.e. carrier frequency) operated by this cell, then the UE shall use the radio resource description indicated by this cell the UE is camped on and ignore any radio resource description of the same radio resource provisioned in the ME or the UICC. If the cell does not provide radio resources for 5G ProSe UE-to-Network Relay discovery, the UE shall not perform 5G ProSe UE-to-Network Relay discovery message transmission and reception on radio resources operated by this cell;

If the UE intends to use "operator-managed" radio resources (i.e. carrier frequency) for 5G ProSe UE-to-Network Relay discovery that are not operated by the UE's serving cell, as specified in clause 5.1.4.1, or if the UE is out of coverage, the UE shall search for a cell in any PLMN that is operating the provisioned radio resources (i.e. carrier frequency) as defined in TS 38.300 [12] and TS 38.304 [13]; and:

If the UE finds such a cell in the registered PLMN or a PLMN equivalent to the registered PLMN, and authorization for 5G ProSe UE-to-Network Relay discovery to this PLMN is confirmed, the UE shall use the radio resource description indicated by that cell. If that cell does not provide radio resources for 5G ProSe UE-to-Network Relay discovery, the UE shall not perform 5G ProSe UE-to-Network Relay discovery message transmission and reception on those radio resources;

If the UE finds such a cell but not in the registered PLMN or a PLMN equivalent to the registered PLMN, and that cell belongs to a PLMN authorized for 5G ProSe UE-to-Network Relay discovery and provides radio resources for 5G ProSe UE-to-Network Relay discovery then the UE shall perform PLMN selection triggered by 5G ProSe UE-to-Network Relay discovery as defined in TS 23.122 [14];

If the UE finds such cell but not in a PLMN authorized for 5G ProSe UE-to-Network Relay discovery the UE shall not use 5G ProSe UE-to-Network Relay discovery;

If the UE does not find any such cell in any PLMN, then the UE shall consider itself "not served by NG-RAN" and use radio resources provisioned in the ME or the UICC. If no such provision exists in the ME or the UICC or the provision does not authorize 5G ProSe UE-to-Network Relay discovery, then the UE is not authorized to transmit;

The UE is allowed to use "operator-managed" radio resources (i.e. carrier frequency) provisioned in the ME or the UICC for 5G ProSe UE-to-Network Relay discovery if the UICC indicates it is authorized;

If the UE intends to use "non-operator-managed" radio resources (i.e. carrier frequency) for ProSe UE-to-Network Relay discovery, according to TS?36.331 [15] or TS 38.331 [16] and as specified in clause 5.1.4.1, then the UE shall perform 5G ProSe UE-to-Network Relay discovery using resource provisioned in the ME or the UICC. If no such provision exists in the ME or the UICC or the provision does not authorize 5G ProSe UE-to-Network Relay discovery, then the UE is not authorized to transmit;

TABLE 2-continued

NOTE 1: It is possible for operators to configure UEs (e.g. Public Safety UEs) to use only "operator-managed" radio resources (i.e. carrier frequency) for 5G ProSe UE-to-Network Relay discovery when the UE is "not served by NG-RAN".
  The UE provisioning shall support setting Geographical Areas;
NOTE 2: It is possible for a UE to use other radio resources for 5G ProSe UE-to-Network Relay discovery based on the Geographical Area instead of those operated by the serving NG-RAN cell, when provisioned in the UE, even if the UE's serving cell offers normal service and the SIBs for NR sidelink communication defined in TS 38.331 [16] indicates that the service (5G ProSe UE-to-Network Relay discovery) is available. This is to cover the scenario when e.g. the radio resources used for 5G ProSe UE-to-Network Relay discovery are not owned by the serving network of the UE.
NOTE 3: When cross-carrier operation is supported, according to TS 36.331 [15] or TS 38.331 [16], a UE can be instructed by its serving cell to perform 5G ProSe UE-to-Network Relay discovery over a different carrier frequency. The UE is still considered as "served by NG-RAN" in this case.
NOTE 4: The scenario that a cell is detected and the cell does not provide support for 5G ProSe UE-to-Network Relay discovery when the UE attempts to use a carrier frequency configured for 5G ProSe UE-to-Network Relay discovery, is considered a configuration error. Therefore, the UE does not transmit on that frequency to avoid interference to the network.
  The 5G ProSe UE-to-Network Relay discovery is only specified for NR.
  Editor's note: It is FFS whether and how to apply the mobility restriction for 5G ProSe UE-to-Network relay or 5G ProSe remote UE.

TABLE 3

5.1.4.2.2 Principles for applying parameters for 5G ProSe UE-to-Network Relay communication
  For 5G ProSe UE-to-Network Relay communication over PC5 reference point, the operator may pre-configure the UEs with the required provisioning parameters for 5G ProSe UE-to-Network Relay communication, without the need for the UEs to connect to the 5GC to get this initial configuration. The following applies:
  The provisioning parameters for 5G ProSe UE-to-Network Relay communication could be from different sources and their priorities are described in clause 5.1.1.
  The ME provisioning parameters shall not be erased when a USIM is deselected or replaced.
  The UE shall use radio resources for 5G ProSe UE-to-Network Relay communication as follows:
    While a UE has a serving cell and is camped on a cell and the UE intends to use for 5G ProSe UE-to-Network Relay communication the radio resources (i.e. carrier frequency) operated by this cell, then the UE shall use the radio resource description indicated by this cell the UE is camped on and ignore any radio resource description of the same radio resource provisioned in the ME or the UICC. If the cell does not provide radio resources for 5G ProSe UE-to-Network Relay communication, the UE shall not perform 5G ProSe UE-to-Network Relay communication message transmission and reception on radio resources operated by this cell;
    If the UE intends to use "operator-managed" radio resources (i.e. carrier frequency) for 5G ProSe UE-to-Network Relay communication that are not operated by the UE's serving cell, as specified in clause 5.1.4.1, or if the UE is out of coverage, the UE shall search for a cell in any PLMN that is operating the provisioned radio resources (i.e. carrier frequency) as defined in TS 38.300 [12] and TS 38.304 [13]; and:
      If the UE finds such a cell in the registered PLMN or a PLMN equivalent to the registered PLMN, and authorization for 5G ProSe UE-to-Network Relay communication to this PLMN is confirmed, the UE shall use the radio resource description indicated by that cell. If that cell does not provide radio resources for 5G ProSe UE-to-Network Relay communication, the UE shall not perform 5G ProSe UE-to-Network Relay communication message transmission and reception on those radio resources;
      If the UE finds such a cell but not in the registered PLMN or a PLMN equivalent to the registered PLMN, and that cell belongs to a PLMN authorized for 5G ProSe UE-to-Network Relay communication and provides radio resources for 5G ProSe UE-to-Network Relay communication then the UE shall perform PLMN selection triggered by 5G ProSe UE-to-Network Relay communication as defined in TS 23.122 [14];
      If the UE finds such cell but not in a PLMN authorized for 5G ProSe UE-to-Network Relay communication the UE shall not use 5G ProSe UE-to-Network Relay communication;
      If the UE does not find any such cell in any PLMN, then the UE shall consider itself "not served by NG-RAN" and use radio resources provisioned in the ME or the UICC. If no such provision exists in the ME or the UICC or the provision does not authorize 5G ProSe UE-to-Network Relay discovery, then the UE is not authorized to transmit;
    The UE is allowed to use "operator-managed" radio resources (i.e. carrier frequency) provisioned in the ME or the UICC for 5G ProSe UE-to-Network Relay communication if the UICC indicates it is authorized;

TABLE 3-continued

If the UE intends to use "non-operator-managed" radio resources (i.e. carrier frequency) for 5G ProSe UE-to-Network Relay communication, according to TS 36.331 [15] or TS 38.331 [16] and as specified in clause 5.1.4.1, then the UE shall perform 5G ProSe UE-to-Network Relay communication using resource provisioned in the ME or the UICC. If no such provision exists in the ME or the UICC or the provision does not authorize 5G ProSe UE-to-Network Relay communication, then the UE is not authorized to transmit;

NOTE 1: It is possible for operators to configure UEs (e.g. Public Safety UEs) to use only "operator-managed" radio resources (i.e. carrier frequency) for 5G ProSe UE-to-Network Relay communication when the UE is "not served by NG-RAN".

The UE provisioning shall support setting Geographical Areas;

NOTE 2: It is possible for a UE to use other radio resources for 5G ProSe UE-to-Network Relay communication based on the Geographical Area instead of those operated by the serving NG-RAN cell, when provisioned in the UE, even if the UE's serving cell offers normal service and the SIBs for NR sidelink communication defined in TS 38.331 [16] indicates that the service (5G ProSe UE-to-Network Relay communication) is available. This is to cover the scenario when e.g. the radio resources used for 5G ProSe UE-to-Network Relay communication are not owned by the serving network of the UE.

NOTE 3: When cross-carrier operation is supported, according to TS 36.331 [15] or TS 38.331 [16], a UE can be instructed by its serving cell to perform 5G ProSe UE-to-Network Relay communication over a different carrier frequency. The UE is still considered as "served by NG-RAN" in this case.

NOTE 4: The scenario that a cell is detected and the cell does not provide support for 5G ProSe UE-to-Network Relay communication when the UE attempts to use a carrier frequency configured for 5G ProSe UE-to-Network Relay communication, is considered a configuration error. Therefore, the UE does not transmit on that frequency to avoid interference to the network.

The 5G ProSe UE-to-Network Relay communication is only specified for NR.

Editor's note: It is FFS whether and how to apply the mobility restriction for UE-to-Network relay or remote UE.

Figure 12:
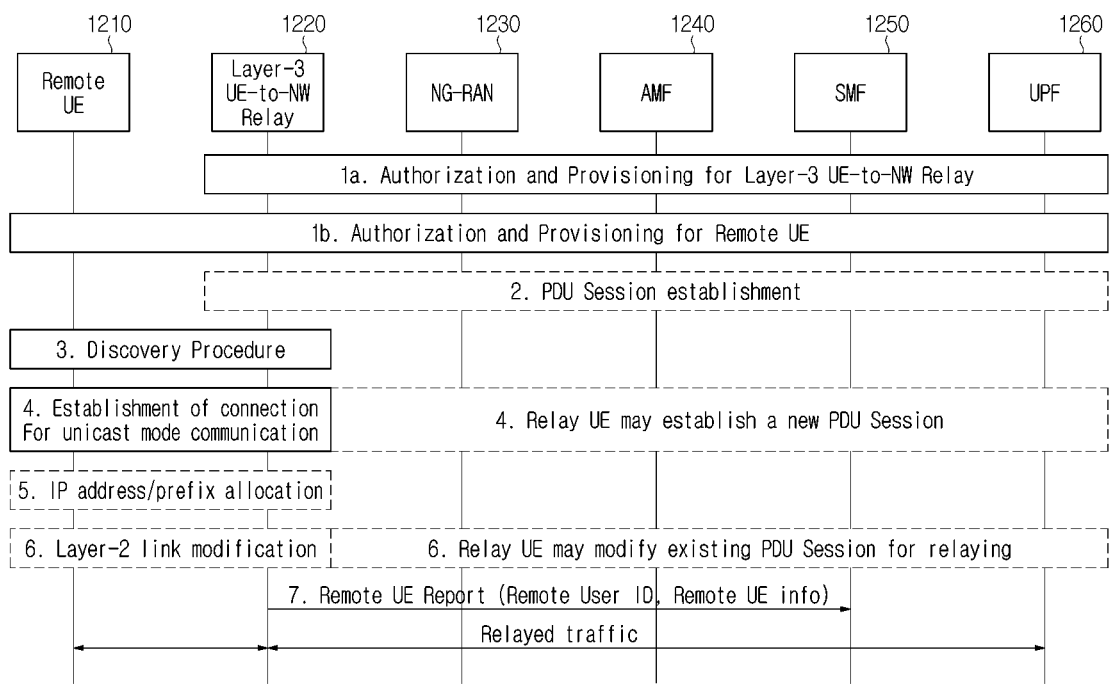
FIG. 12 is a view illustrating a method for performing ProSe communication based on UE-network relay that is applied to the present disclosure.

FIG. 12 is a view illustrating a method for performing ProSe communication based on UE-network relay that is applied to the present disclosure. Referring to FIG. 12, a relay UE 1220 may be registered to a network. As an example, the relay UE 1220 may be a layer-3 UE-to-network relay but will be referred to as relay UE 1220 below for convenience of explanation. Herein, after being registered to a network, the relay UE 1220 may establish a PDU session for providing a relay for a remote UE 1210 or may modify a current PDU session for providing a relay. The relay UE 1220 may use a PDU session for relay traffic for the remote UE 1210. In addition, as an example, a serving PLMN of the relay UE 1220 and a PLMN to which the remote UE 1210 is registered may be identical with or different from each other and may not be limited to a specific form.

More particularly, referring to FIG. 12, service authentication and provisioning for the relay UE 1220 may be performed. In addition, as an example, service authentication and provisioning for the remote UE 1210 may also be performed. Herein, the relay UE 1220 may establish or modify a PDU session for relay. Next, the remote UE 1210 may perform a discovery procedure for the relay UE 1220. Herein, the remote UE 1210 may recognize an accessible service based on the relay UE 1220 through the discovery procedure. Next, the remote UE 1210 and the relay UE may establish a connection for unicast mode communication. In case there is no PDU session associated with a relay service code or a new PDU session for relay is required, the relay UE 1220 may start a procedure of establishing a new PDU session before completely establishing a PC5 connection. In addition, as an example, the relay UE 1220 may determine a PDU session type for relay.

Herein, based on the PDU session type for relay, the relay UE 1220 may perform a relay function in a corresponding layer. Next, an IP address and a prefix may be allocated to the remote UE 1210 and the relay UE 1220. The remote UE 1210 may deliver a PC5 QoS rule to the relay UE 1220, and the relay UE 1220 may generate a packet filter used in a Uu interface based on the PC5 QoS rule. Next, the relay UE 1220 may perform a PDU session change and set a new QoS flow or combine traffic to an existing QoS flow. Next, the remote UE 1210 may perform uplink and downlink relay based on the relay UE 1220. Herein, in case downlink traffic is forwarded, the PC5 QoS rule may be applied to a downlink packet for PC5 QoS flow. In addition, as an example, in case uplink traffic is forwarded, a 5G QoS rule may be applied to an uplink packet for Uu QoS flow. Next, for a PDU session associated with relay, the relay UE 1220 may deliver a remote UE report including a remote UE ID and remote UE information to the SMF 1250. Herein, the remote UE ID is an ID for identifying a remote UE and may be an identifier of the remote UE that successfully performs connection to the relay UE 1220. Based on what is described above, the remote UE 1210 may perform traffic exchange with a network through the relay UE 1220. Herein, the core network may perform authentication for a UE that performs connection to the core network.

In case a remote UE is connected to a 5G core network based on a relay UE, the remote UE and the 5G core network may perform primary authentication. Next, a remote UE connected to the 5G core network may request to generate a PDU session for access to a specific data network based on a relay UE. Herein, secondary authentication may be performed between the remote UE and the data network, which is the same as described above.

As an example, based on a predetermined condition, secondary authentication may be revoked or discarded according to a determination of a 5G core network or a data network. Herein, also in a previous wireless communication system, after a UE performs secondary authentication with a data network, the secondary authentication may be revoked based on a predetermined condition. As an example, in case secondary authentication is revoked, a PDU session, which a UE generates for access to a specific data network, may be canceled, and a procedure for this may be performed.

However, in consideration of a ProSe relay structure of a remote UE and a relay UE, a plurality of remote UEs may be connected to a single relay UE. Accordingly, as in a previous wireless communication system, in case second authentication is revoked so that a PDU session generated by a remote UE in a data network through a relay UE is canceled, other remote UEs connected to the same relay UE may not be provided with a service. That is, as secondary authentication is revoked based on a specific remote UE among a plurality of remote UEs connected to a single relay UE, when a PDU session of the relay UE is canceled, there may be a problem with providing a service of another remote UE, a procedure for this may be necessary, and a concrete method for this will be described below.

As an example, in case a remote UE is connected to a core network through a relay UE based on ProSe relay, the remote UE may perform a primary authentication procedure with the core network through the relay UE. After primary authentication, the remote UE may request to generate a PDU session for access to a specific data network based on ProSe relay and perform secondary authentication with the data network, which is the same as described above.

Herein, secondary authentication between a remote UE and a data network may be revoked and discarded based on a predetermined condition. As an example, a predetermined condition for the revocation and discarding of secondary authentication may be a certificate renewal, revocation, expiration of validity, and other causes and may not be limited to a specific embodiment. Hereinafter will be described a method for solving the problem of other remote UEs connected to a relay UE in failing to receive a service, in case a PDU session generated by a remote UE in a data network through the relay UE based on an operation of revoking secondary authentication in a previous wireless communication system.

Figure 13:
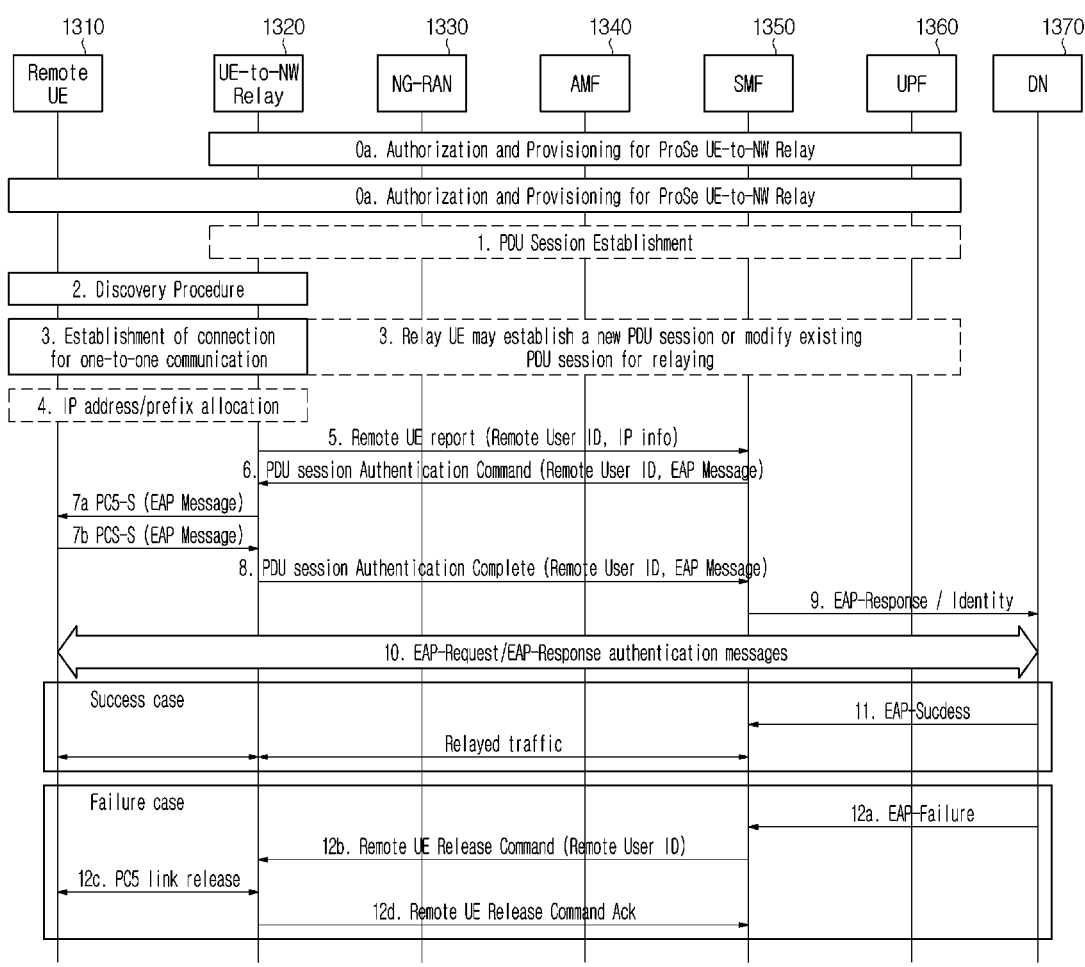
FIG. 13 is a view illustrating a method for performing secondary authentication after setting PC5 link according to an embodiment of the present disclosure.

FIG. 13 is a view illustrating a method for performing secondary authentication after setting PC5 link according to an embodiment of the present disclosure.

Referring to FIG. 13, a remote UE 1310 and a relay UE 1320 may perform pre-authentication from each network so as to operate in a ProSe UE-to-network relay system. Herein, each of the remote UE 1310 and the relay UE 1320 may receive information considering a ProSe relay operation. Information considering a ProSe relay operation may include information on an authentication scheme, information necessary for direct discovery between UEs, and other types of information, but is not limited to a specific form.

Next, the relay UE 1320 may generate a PDU session in advance which is capable of providing a relay service when the remote UE 1310 is being connected. The remote UE 1310 may perform a discovery procedure for the relay UE 1320 based on information considering a ProSe relay operation. As an example, the remote UE 1310 may perform the discovery of the relay UE 1320 based on information considering a ProSe relay operation and discover the relay UE 1320 based on at least one of FIG. 10 and FIG. 11 described above.

Next, the remote UE 1310 may perform a procedure of establishing a connection for direct communication with the relay UE 1320. Herein, the remote UE 1310 may deliver an ID of the remote UE (e.g. SUCI) to the relay UE 1320. The relay UE 1320 may request AMF 1340 of the relay UE to authenticate the remote UE 1310 based on the received ID of the remote UE. Based on what is described above, a network may perform primary authentication with the remote UE 1310 through the relay UE 1320.

Next, based on a result of the primary authentication, the remote UE 1310 and the relay UE 1320 may perform a direct security mode command procedure between the remote UE 1310 and the relay UE 1320 and configure a security channel in a PC5 interface.

In case there is no PDU session satisfying a PC5 connection requirement of the remote UE 1310, the relay UE 1320 may perform a procedure for establishing anew PDU session or a procedure for modifying a PDU session. As an example, the PC5 connection requirement may be set by considering at least one of S-NSSAI, DNN, QoS, and UP security enabled states, but is not limited to the above-described embodiment.

Next, the relay UE 1320 may transmit a remote UE report message to the SMF 1350. Herein, the remote UE report message may include at least one of a remote UE ID and remote UE information. As an example, the remote UE ID may be identification information of a remote UE user, and the remote UE information may be information used for identifying a remote UE in 5GC. Specifically, when a PDU session is an IP type, remote UE information may be IP information of a remote UE. On the other hand, when a PDU session is an ethernet type, remote UE information may be an MAC address of a remote UE. The SMF 1350 may store a remote UE ID and remote UE information in a context for a PDU session that is used for relay. Next, a PDU session of a relay UE, which is to be used by the remote UE 1310, may be completely configured. The remote UE 1310 may perform secondary authentication of a data network that will be connected with the remote UE 1310 according to a network setting.

Next, the relay UE 1320 may transmit an EAP message to the remote UE 1310 through PC5 signaling and receive an EAP message from the remote UE 1310 through PC5 signaling. The relay UE 1320 may transmit a PDU session authentication completion message, which includes an ID of the remote UE and an EAP message received the remote UE, to the SMF 1350. The SMF 1350 may transmit an EAP message to data network-authentication, authorization and accounting (DN-AAA) 1360. Next, the DN-AAA 1360 and the remote UE 1310 may exchange EAP messages. Herein, when authentication is successful, the DN-AAA 1360 may transmit an EAP success message to the SMF 1350, and the remote UE 1310 may perform communication through the relay UE 1320. On the other hand, when authentication fails, the DN-AAA 1360 may transmit an EAP failure message to the SMF 1350. The SMF 1350 may transmit a remote UE release command message including a remote UE ID to the relay UE 1320. The relay UE 1320 may release a PC5 link with the remote UE and transmit an ACK response for the remote UE release command message to the SMF 1350.

Figure 14:
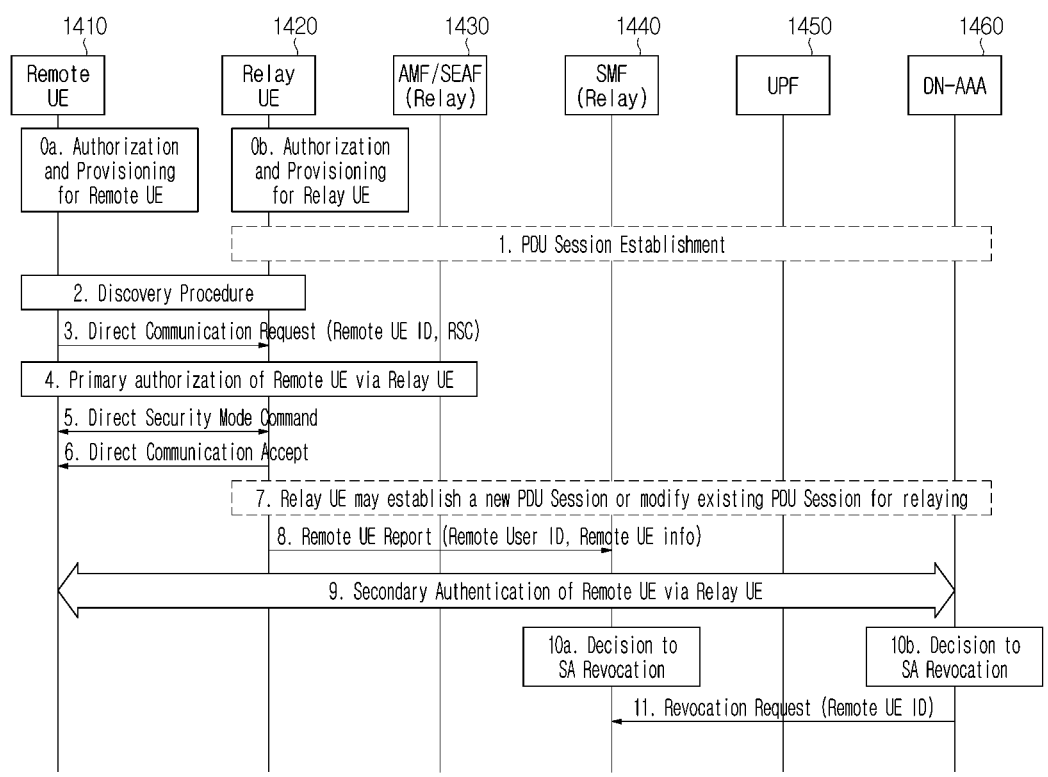
FIG. 14 is a view illustrating a method for performing primary authentication and secondary authentication by a remote UE through a relay UE according to an embodiment of the present disclosure.

FIG. 14 is a view illustrating a method for a remote UE to perform secondary authentication and revoke secondary authentication through a relay UE according to an embodiment of the present disclosure.

Referring to FIG. 14, a remote UE 1410 and a relay UE 1420 may perform pre-authentication from each network so as to operate in a ProSe UE-to-network relay system.

Herein, each of the remote UE 1410 and the relay UE 1420 may receive information considering a ProSe relay operation. As an example, information considering a ProSe relay operation may include information on an authentication scheme, information necessary for direct discovery between UEs, and other types of information, but is not limited to a specific form.

Next, the relay UE 1420 may generate a PDU session in advance which is capable of providing a relay service when the remote UE 1410 is being connected. As an example, the remote UE 1410 may perform the discovery of the relay UE 1420 based on information considering a ProSe relay operation and discover the relay UE 1420 based on at least one of FIG. 10 and FIG. 11 described above.

Next, the remote UE 1410 may transmit a connection request (direct communication request) message, which includes a remote UE ID and a relay service code (RSC), to the relay UE 1420. The relay UE 1420 may request AMF/SEAF 1430 of the relay UE to authenticate the remote UE 1410 based on the received ID of the remote UE. Thus, a network may perform primary authentication with the remote UE 1410.

Next, based on a result of the primary authentication, the remote UE 1410 and the relay UE 1420 may perform a direct security mode command procedure between the remote UE 1410 and the relay UE 1420 and configure a security channel in a PC5 interface. As a response to the direct communication request message, the relay UE 1420 may transmit a direct communication accept message to the remote UE 1410 and complete a PC5 channel setting.

Herein, the relay UE 1420 may determine PDU session parameters that are mapped with the received RSC of the remote UE. As an example, a PDU session parameter may include at least one of a PDU session type, DNN, an SSC mode, S-NSSAI, and an access type preference, but may not be limited thereto. As an example, in case a PDU session, which the relay UE 1420 generates for a relay service in advance, satisfies a PDU session parameter condition that is mapped with an RSC of the remote UE 1410, the relay UE 1420 may use an existing PDU session as it is.

On the other hand, in case a PDU session, which the relay UE 1420 generates for a relay service in advance, does not satisfy a PDU session parameter condition that is mapped with an RSC of the remote UE 1410, the relay UE 1420 may request to generate a new PDU session or request to modify an existing PDU session. Next, the relay UE 1420 may transmit a remote UE report message to the SMF 1440. Herein, the remote UE report message may include at least one of a remote UE ID and remote UE information. As an example, the remote UE ID may be identification information of a remote UE user, and the remote UE information may be information used for identifying a remote UE in 5GC. Specifically, when a PDU session is an IP type, remote UE information may be IP information of a remote UE. On the other hand, when a PDU session is an ethernet type, remote UE information may be an MAC address of a remote UE. The SMF 1440 may store a remote UE ID and remote UE information in a context for a PDU session that is used for relay. Next, a PDU session of a relay UE, which is to be used by the remote UE 1410, may be completely configured. The remote UE 1410 may perform secondary authentication of a data network that will be connected with the remote UE 1410 according to a network setting, and thus may perform communication with a data network via the relay UE 1420.

Herein, secondary authentication may be revoked and discarded. As an example, secondary authentication may be revoked and discarded based on a predetermined condition. Specifically, secondary authentication may be revoked and discarded based on the expiration of authentication when the authentication needs to be renewed. As another example, secondary authentication may be revoked and discarded when a policy about the authentication is modified. As another example, secondary authentication may be revoked and discarded based on a configuration change of a network and a data network but may not be limited the above-described condition. Herein, the revocation and discarding of secondary authentication may be determined by the SMF 1440 of a network. As another example, the revocation and discarding of secondary authentication may also be determined by the DN-AAA 1460 and is not limited to a specific embodiment.

As an example, in case the revocation and discarding of secondary authentication for a specific remote UE is determined by the DN-AAA 1460, the DN-AAA 1460 may transmit, to the SMF 1440, an authentication revocation request message for the remote UE 1410. Herein, the authentication revocation request message may be determined according to an interface between the SMF 1440 and the external DN-AAA 1460 and a protocol. The authentication revocation request message may include a remote UE ID (e.g. GPSI, IP address, MAC address, etc) for indicating the specific remote UE 1410, based on which secondary authentication may be revoked and discarded.

Herein, as an example, as described above, since a plurality of remote UEs may be connected to the relay UE 1420, when secondary authentication is revoked and discarded based on a specific remote UE, a PDU session of the relay UE needs to be maintained for other remote UEs.

Figure 15:
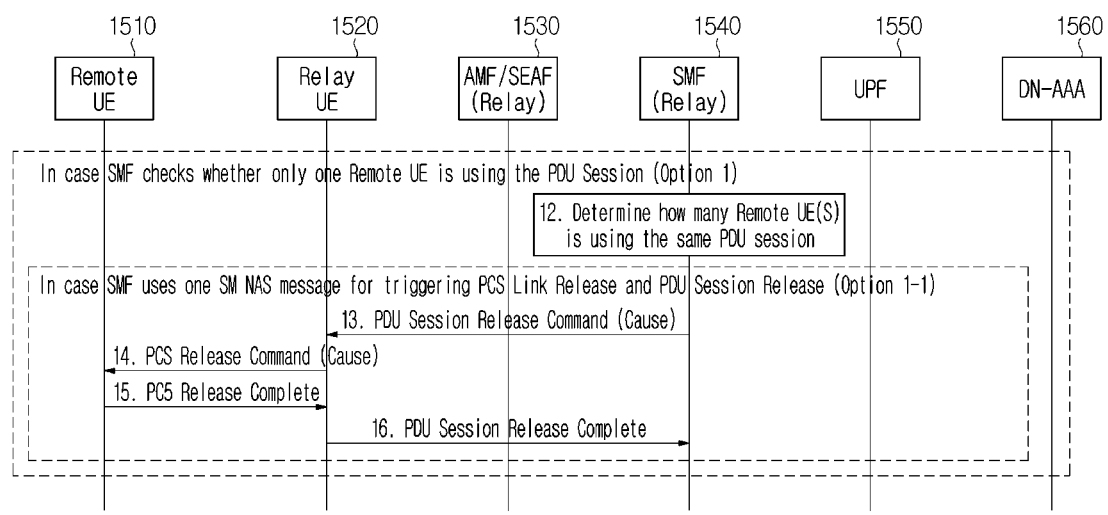
FIG. 15 is a view illustrating a method for maintaining a PDU session based on secondary authentication revocation and discarding according to an embodiment of the present disclosure.

FIG. 15 is a view illustrating a method for maintaining a PDU session based on secondary authentication revocation and discarding according to an embodiment of the present disclosure. Referring to FIG. 15, an SMF 1540 may check at least one of remote UEs 1510 using a same PDU session. That is, the SMF 1540 may check whether or not there is a remote UE other than a specific remote UE 1510, of which the secondary authentication is to be revoked and discarded, in a same PDU session of a relay UE.

Specifically, the SMF 1540 may receive, from the DN-AAA 1560, a command to revoke secondary authentication for a specific remote UE. As another example, the SMF 1540 may directly revoke and discard secondary authentication for the specific remote UE 1510 based on a setting. As an example, when a secondary authentication revocation and discarding condition is satisfied, the SMF 1540 may check whether or not there is any other remote UE than the remote UE 1510 in a PDU session of a relay UE that the remote UE is using. That is, the SMF 1540 may determine whether or not another remote UE is being shared and used in the PDU session. As an example, as described above, a remote UE ID and remote UE information are stored in a context for a PDU session, and the SMF 1540 may determine whether or not there is another remote UE in the PDU session based on the above-described information.

Herein, in case another remote UE is not additionally present in a PDU session of a relay UE in which a remote UE requested to revoke secondary authentication is being used, the SMF 1540 may transmit a PDU session release request message of the relay UE 1520 to the relay UE 1520. Herein, the PDU session release request message may include a release cause value, and a release cause may order secondary authentication of a remote UE to be revoked. In addition, as an example, the PDU session release request message may include information for ordering the relay UE 1520 to release a PC5 channel to the remote UE 1510. In order to release the PC5 channel connected to the remote UE 1510 based on the PDU session release request message received from the SMF, the relay UE 1520 may transmit a PC5 channel release command message to the remote UE 1510. Herein, the PC5 channel release command message may include a release cause value. A release cause value may order the remote UE to revoke secondary authentication. The remote UE 1510 may perform a PC5 channel release operation based on the PC5 channel release command message and transmit, to the relay UE 1520, a PC5 release complete message as PC5 release result information. Next, the relay UE 1520 may complete PC5 channel release and transmit the requested PDU session release complete message to the SMF 1540.

That is, in case another remote UE is not additionally present in a PDU session of a relay UE in which a remote UE requested to revoke secondary authentication is being used, the SMF 1540 may order the relay UE 1520 to release a PC5 channel and to release a PDU session through a single message.

However, as an example, a PDU session of a relay UE may be present by default. In addition, as another example, a PDU session of a relay UE needs to exist based on another request or any other cause, and in consideration of this, PDU session release and PC5 channel release may be ordered to the relay UE 1520 through respective messages.

Figure 16:
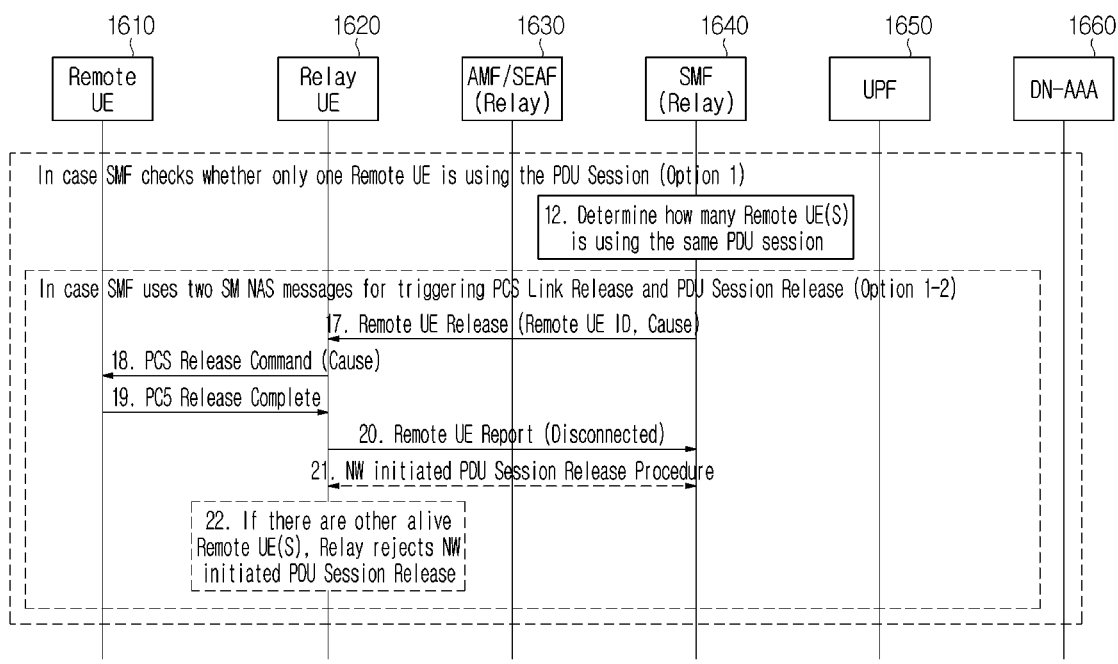
FIG. 16 is a view illustrating a method for maintaining a PDU session based on secondary authentication revocation and discarding according to an embodiment of the present disclosure.

FIG. 16 is a view illustrating a method for maintaining a PDU session based on secondary authentication revocation and discarding according to an embodiment of the present disclosure. Referring to FIG. 16, an SMF 1640 may check at least one of remote UEs 1610 using a same PDU session. That is, the SMF 1640 may check whether or not there is a remote UE other than a specific remote UE 1610, of which the secondary authentication is to be revoked and discarded.

Specifically, the SMF 1640 may receive, from the DN-AAA 1660, a command to revoke secondary authentication for a specific remote UE. As another example, the SMF 1640 may directly revoke and discard secondary authentication for the specific remote UE 1610 based on a setting. As an example, when a secondary authentication revocation and discarding condition is satisfied, the SMF 1640 may check whether or not there is any other remote UE than the remote UE 1610 in a PDU session of a relay UE that the remote UE is using. That is, the SMF 1640 may determine whether or not another remote UE is being shared and used in the PDU session. As an example, as described above, a remote UE ID and remote UE information are stored in a context for a PDU session, and the SMF 1640 may determine whether or not there is another remote UE in the PDU session based on the above-described information.

Herein, in case another remote UE is not additionally present in a PDU session of a relay UE in which a remote UE requested to revoke secondary authentication is being used, the SMF 1640 may transmit, to the relay UE 1620, a PC5 channel release request message for the remote UE 1610, of which the secondary authentication is revoked. Herein, the PC5 channel release request message may be an NAS message. As an example, the PC5 channel release request message may include at least one of a remote UE ID and a release cause in order to enable the relay UE 1620 to identify the remote UE 1610.

The relay UE 1620 may transmit a PC5 channel release command message to the remote UE 1610 that corresponds to the remote UE ID delivered from the SMF 1640. Herein, the PC5 channel release command message may include a release cause value. A release cause may order the remote UE to revoke secondary authentication. The remote UE 1610 may perform a PC5 channel release operation based on the PC5 channel release command received from the relay UE 1620. Next, the remote UE 1610 may notify the completion of the PC5 channel release by transmitting a PC5 release complete message to the relay UE 1620. Next, the relay UE 1620 may notify to the SMF 1640 that the remote UE 1610 and the PC5 channel are normally released. As an example, based on a remote UE report, the relay UE 1620 may indicate to the SMF 1640 that PC5 channel release is normally completed. As another example, as a response to the above-described remote UE PC5 release request, the relay UE 1620 may indicate, through a remote UE PC5 release response message, that PC5 channel release is normally completed.

Next, the SMF 1640 may check whether or not there is another remote UE using the PDU session. Herein, in case there is no other UE using the PDU session, the SMF 1640 may perform an operation of releasing the PDU session with the relay UE 1620. That is, based on another message, the SMF 1640 may order the relay UE 1620 to release a PC5 channel and the PDU session.

Herein, in case the relay UE 1620 receives a PDU session release request from the SMF 1640 on the ground that there is no other remote UE using the PDU session, the relay UE 1620 may perform the release of the PDU session. However, in case an access request of another remote UE occurs before the relay UE 1620 performs the operation of releasing the PDU session, the relay UE 1620 may not implement the PDU session release request of the SMF 1640 but maintain and reuse the PDU session. That is, even when the relay UE 1620 receives a PDU session release request from the SMF 1640, if there is another remote UE in a corresponding PDU session, the relay UE 1620 may reject the request of the SMF 1640 and maintain the PDU session.

Figure 17:
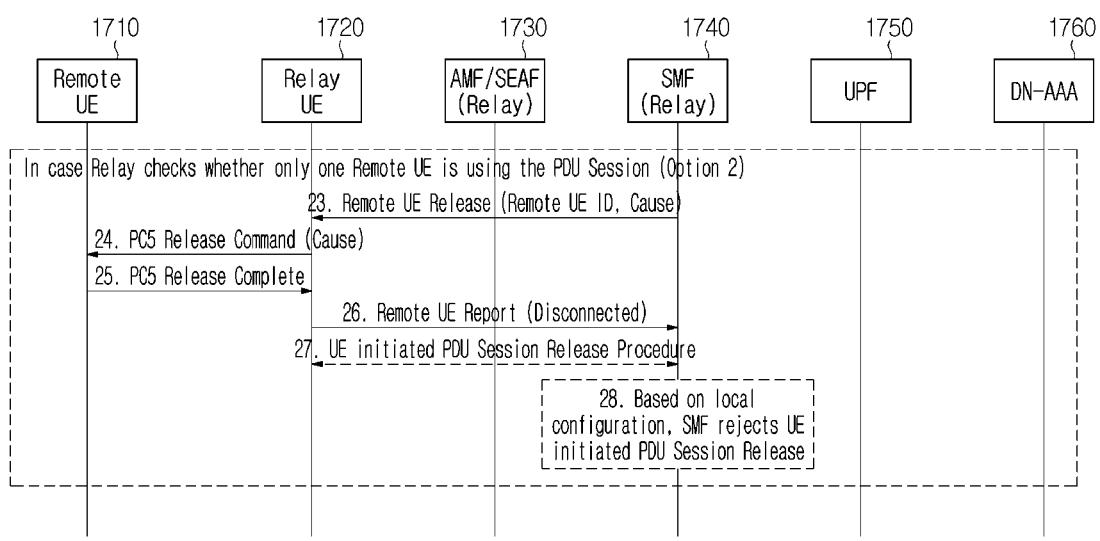
FIG. 17 is a view illustrating a method for maintaining a PDU session according to an embodiment of the present disclosure.

FIG. 17 is a view illustrating a method for maintaining a PDU session according to an embodiment of the present disclosure.

Referring to FIG. 17, a relay UE 1720 may check at least one of remote UEs 1710 using a same PDU session. That is, the relay UE 1720 may check whether or not there is a remote UE other than a specific remote UE 1710, of which the secondary authentication is to be revoked and discarded, in a PDU session of the relay UE.

Specifically, the SMF 1740 may receive, from the DN-AAA 1760, a command to revoke secondary authentication for a specific remote UE. As another example, the SMF 1740 may directly revoke and discard secondary authentication for the specific remote UE 1710 based on a setting. As an example, in case a secondary authentication revocation and discarding condition is satisfied, the SMF 1740 may transmit, to the relay UE 1720, a PC5 channel release request message for the remote UE 1710, of which the secondary authentication is revoked.

Herein, the PC5 channel release request message may be an NAS message. As an example, the PC5 channel release request message may include at least one of a remote UE ID and a release cause in order to enable the relay UE 1720 to identify the remote UE 1710.

The relay UE 1720 may transmit a PC5 channel release command message to the remote UE 1710 that corresponds to the remote UE ID delivered from the SMF 1740. Herein, the PC5 channel release command message may include a release cause value. A release cause may order the remote UE to revoke secondary authentication. The remote UE 1710 may perform a PC5 channel release operation based on the PC5 channel release command received from the relay UE 1720. Next, the remote UE 1710 may notify the completion of the PC5 channel release by transmitting a PC5 release complete message to the relay UE 1720. Next, the relay UE 1720 may notify the SMF 1740 that the remote UE 1710 and the PC5 channel release are normally completed. As an example, based on a remote UE report, the relay UE 1720 may indicate to the SMF 1740 that PC5 channel release is normally completed. As another example, as a response to the above-described remote UE PC5 release request, the relay UE 1720 may indicate, through a remote UE PC5 release response message, that PC5 channel release is normally completed.

Herein, the relay UE 1720 may determine whether or not there is another additional remote UE using the PDU session. In case it is determined that there is no other remote UE than a remote UE in the PDU session, of which the secondary authentication is revoked and discarded, the relay UE 1720 may start a procedure for releasing the PDU session. That is, based on a remote UE release command from the SMF 1740, the relay UE 1720 may release the remote UE 1710 and a PC5 channel and determine whether or not to release the PDU session. That is, when there is no other remote UE using the PDU session, the relay UE 1720 may transmit a PDU session release request for releasing the PDU session to the SMF 1740. However, as an example, in case the relay UE 1720 requests the SMF 1740 to release the PDU session after determining that there is no other remote UE using the PDU session, the SMF 1740 may reject the release request by a separate policy (local configuration) and maintain the PDU session for a next relay service, but the present disclosure is not limited thereto.

On the other hand, in case the relay UE 1720 determines that the PDU session is additionally used by another remote UE, the relay UE 1720 may not release but maintain the PDU session.

Figure 18:
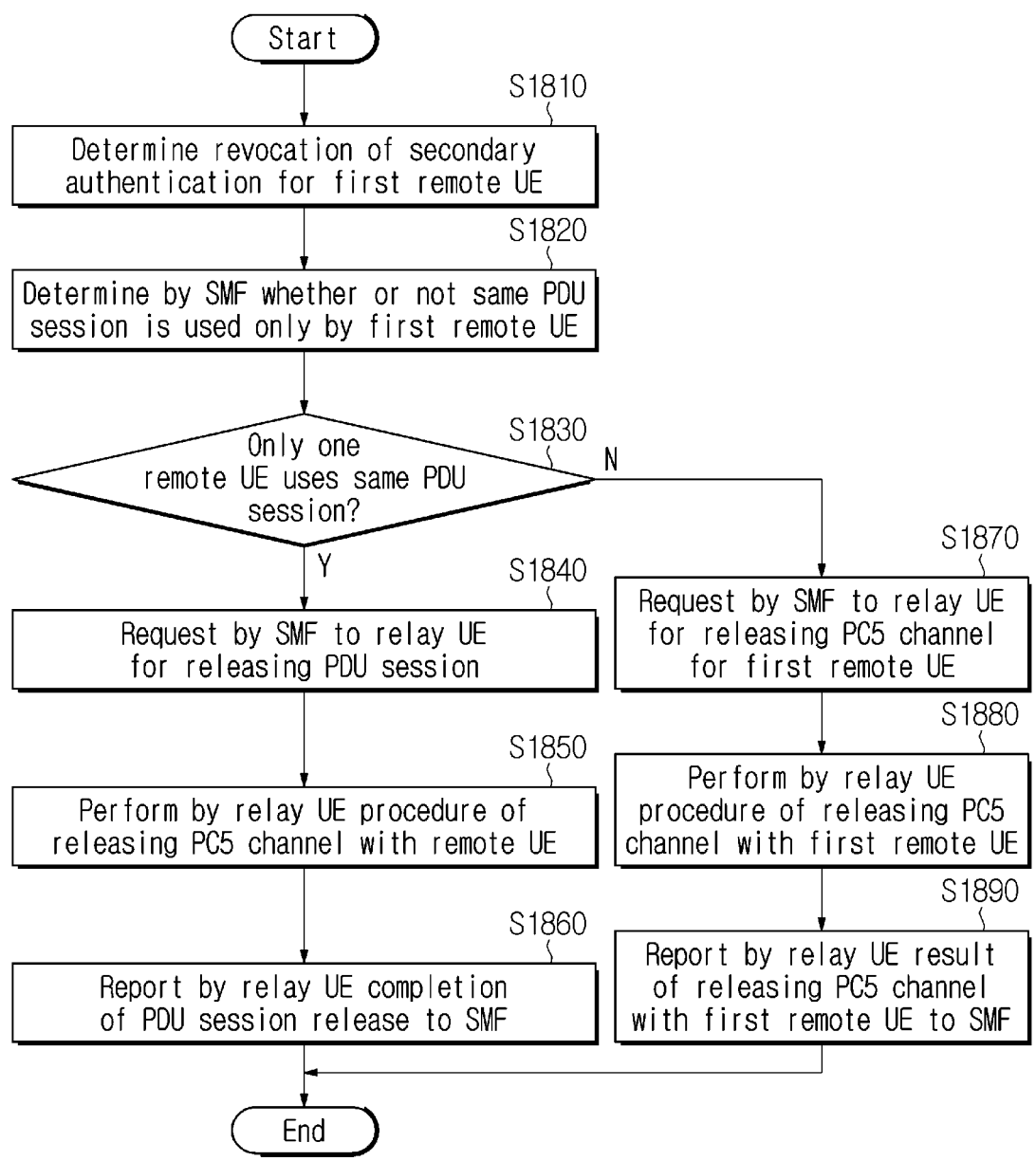
FIG. 18 is a view illustrating a method for performing a secondary authentication revocation procedure based on SMF according to an embodiment of the present disclosure.

FIG. 18 is a view illustrating a method for performing a secondary authentication revocation procedure based on SMF according to an embodiment of the present disclosure.

Referring to FIG. 18, secondary authentication revocation for a first remote UE may be determined (S1810). As an example, the first remote UE may be a specific remote UE among a plurality of remote UEs. The secondary authentication revocation for the first remote UE may be determined based on a predetermined condition and is not limited to a specific cause. Herein, as an example, the secondary authentication revocation for the first remote UE may be determined by a SMF.

As a concrete example, in case the first remote UE leaves a communication-permitted zone, secondary authentication may be revoked. As another example, in case an access UPF for transmitting user plane data is reconfigured, secondary authentication may be revoked. As another example, in case RAN fails to allocate a PDU session resource in a mobility situation, secondary authentication may be revoked.

As another example, the secondary authentication revocation for the first remote UE may be determined by a request of DN-AAA. As a concrete example, in case the validity period of qualification used for secondary authentication between an external DN-AAA and the first remote UE has expired, a revocation request for revoking the secondary authentication may be executed. In addition, as an example, a qualification operating regulation of a DN-AAA is modified, a secondary authentication revocation request may be executed, but may not limited thereto.

Next, PDU session and PC5 channel release may be performed based on secondary authentication revocation of a remote UE. Herein, a subject determining the number of remote UEs using a PDU session of a same relay UE may be different. As an example, the number of remote UEs using a PDU session of a same relay UE may be determined by a SMF. That is, based on determination of secondary authentication revocation for the first remote UE, the SMF may determine whether or not only the first remote UE uses a same PDU session of a relay UE (S1820). The SMF may check whether or not another remote UE additionally uses the PDU session of the relay UE that the first remote UE currently uses, for which the secondary authentication is revoked. Herein, since the SMF stores information on a remote UE and information on a relay UE, which are provided when the remote UE accesses a PDU session through a relay UE, the SMF may check a remote UE that uses a same PDU session of the relay UE. Herein, in case there is one remote UE that uses a PDU session of a relay UE (S1820), the SMF may transmit, to the relay UE, a PDU session release request message for requesting to release a PDU session and a PC5 channel that are used in a relay service (S1830). Herein, the PDU session release request message may be an NAS message. That is, the SMF may request the relay UE to release a PDU session and to release a PC5 channel at the same time. The PDU session release request message may include a release cause value. The release cause value may indicate revocation of secondary authentication for a remote UE. Next, the relay UE may perform a PC5 channel release procedure with the first remote UE connected to the relay UE (S1840). Herein, the relay UE may transmit a PC5 channel release request message to the first remote UE. The PC5 channel release request message may include the release cause value delivered from the SMF. In case PC5 channel release between the first remote UE and the relay UE is completed, the relay UE may complete a PDU session release operation and report a PDU session release complete state to the SMF (S1850).

On the other hand, in case at least one remote UE other than the first UE is being used in the same PDU session of the relay UE (S1820), the SMF may transmit two SM NAS messages to the relay UE. That is, the SMF may make a PC5 channel release request and a release request for the PDU session respectively. As an example, the SMF may transmit a PC5 channel release request message to the relay UE in order to release a PC5 channel with the first remote UE for which secondary authentication is revoked (S1860). Herein, the message that the SMF sends to the relay UE may be a NAS message. That is, the SMF may transmit a remote UE release request message to the relay UE, and the PC5 channel release request message may be as shown in Table 4 below. As an example, a remote UE release request may include remote UE ID information for specifying a remote UE and a release cause value. As an example, the release cause value may indicate revocation of secondary authentication.

TABLE 4

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | Remote UE release message identity | Message type | M | V | 1 |

TABLE 4-continued

| IEI | Information Element | Type/Reference | Presence | Format | Length |
|---|---|---|---|---|---|
| | Remote UE ID | Remote UE ID IE | O | | |
| | 5GSM cause | 5GSM cause | O | TV | 2 |

Next, the relay UE may perform a procedure of releasing the PC5 channel with the first remote UE, which is requested from the SMF (S1870). Herein, the PC5 channel release request message may include the release cause value delivered from the SMF. In case PC5 channel release between the remote UE and the relay UE is completed, the relay UE may report a release result for the PC5 channel with the remote UE to the SMF through a NAS message, which is ordered (S1880). Next, the SMF may determine whether to maintain or release a PDU session of the relay UE for a relay service. As an example, in case there is no other remote UE using the PDU session or no further reuse is necessary, the SMF may additionally transmit a release request for the PDU session to the relay UE. Herein, the PDU session release request message may be a SM NAS message. As an example, in case the SMF requests the relay UE to release the PDU session, the relay UE may perform a release operation or reject it based on a predetermined condition. As an example, although the relay UE receives a release request from the SMF, in case another remote UE, which satisfies the condition for using the PDU session, makes a request for accessing the PDU session, the relay UE may reject the PDU session release request of the SMF and keep using the PDU session for the relay service of the another remote UE.

Figure 19:
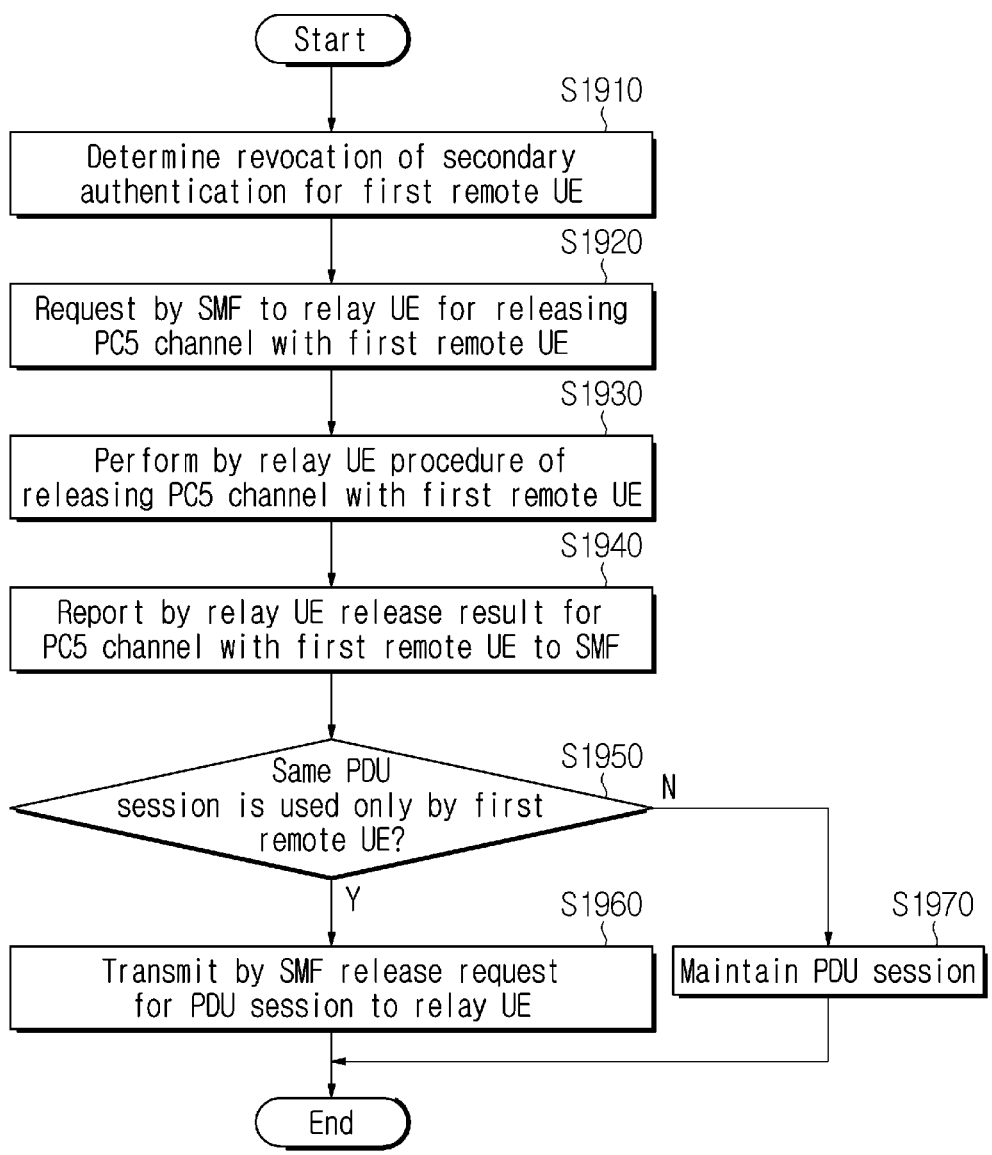
FIG. 19 is a view illustrating a method for performing a secondary authentication revocation procedure based on SMF according to an embodiment of the present disclosure.

FIG. 19 is a view illustrating a method for performing a secondary authentication revocation procedure based on SMF according to an embodiment of the present disclosure.

Referring to FIG. 19, secondary authentication revocation for a first remote UE may be determined (S1910). As an example, the first remote UE may be a specific remote UE among a plurality of remote UEs. The secondary authentication revocation for the first remote UE may be determined based on a predetermined condition and is not limited to a specific cause. Herein, as an example, the secondary authentication revocation for the first remote UE may be determined by a SMF.

As a concrete example, in case the first remote UE leaves a communication-permitted zone, secondary authentication may be revoked. As another example, in case an access UPF for transmitting user plane data is reconfigured, secondary authentication may be revoked. As another example, in case RAN fails to allocate a PDU session resource in a mobility situation, secondary authentication may be revoked.

As another example, the secondary authentication revocation for the first remote UE may be determined by a request of DN-AAA. As a concrete example, in case the validity period of qualification used for secondary authentication between an external DN-AAA and the first remote UE has expired, a revocation request for revoking the secondary authentication may be executed. In addition, as an example, a qualification operating regulation of a DN-AAA is modified, a secondary authentication revocation request may be executed, but may not limited thereto.

Next, PDU session and PC5 channel release may be performed based on secondary authentication revocation of a remote UE. Herein, a subject determining the number of remote UEs using a PDU session of a same relay UE may be different. As an example, the number of remote UEs using a PDU session of a same relay UE may be determined by a SMF. That is, based on determination of secondary authentication revocation for the first remote UE, the SMF may determine whether or not only the first remote UE uses a same PDU session of a relay UE. The SMF may check whether or not another remote UE additionally uses the PDU session of the relay UE that the first remote UE currently uses, for which the secondary authentication is revoked. Herein, since the SMF stores information on a remote UE and information on a relay UE, which are provided when the remote UE accesses a PDU session through a relay UE, the SMF may check a remote UE that uses a same PDU session of the relay UE. Herein, the SMF may transmit two SM NAS messages to the relay UE. That is, the SMF may make a PC5 channel release request and a release request for the PDU session respectively. As an example, the SMF may transmit a PC5 channel release request message to the relay UE in order to release a PC5 channel with the first remote UE for which secondary authentication is revoked (S1920). Herein, the message that the SMF sends to the relay UE may be a NAS message. That is, the SMF may transmit a remote UE release request message to the relay UE, and the PC5 channel release request message may be described as in Table 4 above. As an example, a remote UE release request may include remote UE ID information for specifying a remote UE and a release cause value. As an example, the release cause value may indicate revocation of secondary authentication.

Next, the relay UE may perform a procedure of releasing a PC5 channel with the first remote UE, which is requested from the SMF (S1930). Herein, the PC5 channel release request message may include the release cause value delivered from the SMF. In case PC5 channel release between the remote UE and the relay UE is completed, the relay UE may report a release result for the PC5 channel with the remote UE to the SMF through a NAS message, which is ordered (S1940). Next, the SMF may determine whether to maintain or release a PDU session of the relay UE for a relay service. That is, the SMF may determine whether or not any other remote UE than the first remote UE is using the same PDU session. As an example, in case there is no other remote UE using the PDU session or no further reuse is necessary (S1950), the SMF may additionally transmit a release request for the PDU session to the relay UE (S1960). Herein, the PDU session release request message may be a SM NAS message. As an example, in case the SMF requests the relay UE to release the PDU session, the relay UE may perform a release operation or reject it based on a predetermined condition. As an example, although the relay UE receives a release request from the SMF, in case another remote UE, which satisfies the condition for using the PDU session, makes a request for accessing the PDU session, the relay UE may reject the PDU session release request of the SMF and keep using the PDU session for the relay service of the another remote UE.

On the other hand, in case there is another remote UE than the first remote UE in the same PDU session, the SMF may maintain the PDU session, not transmitting a message for releasing the PDU session (S1970).

Figure 20:
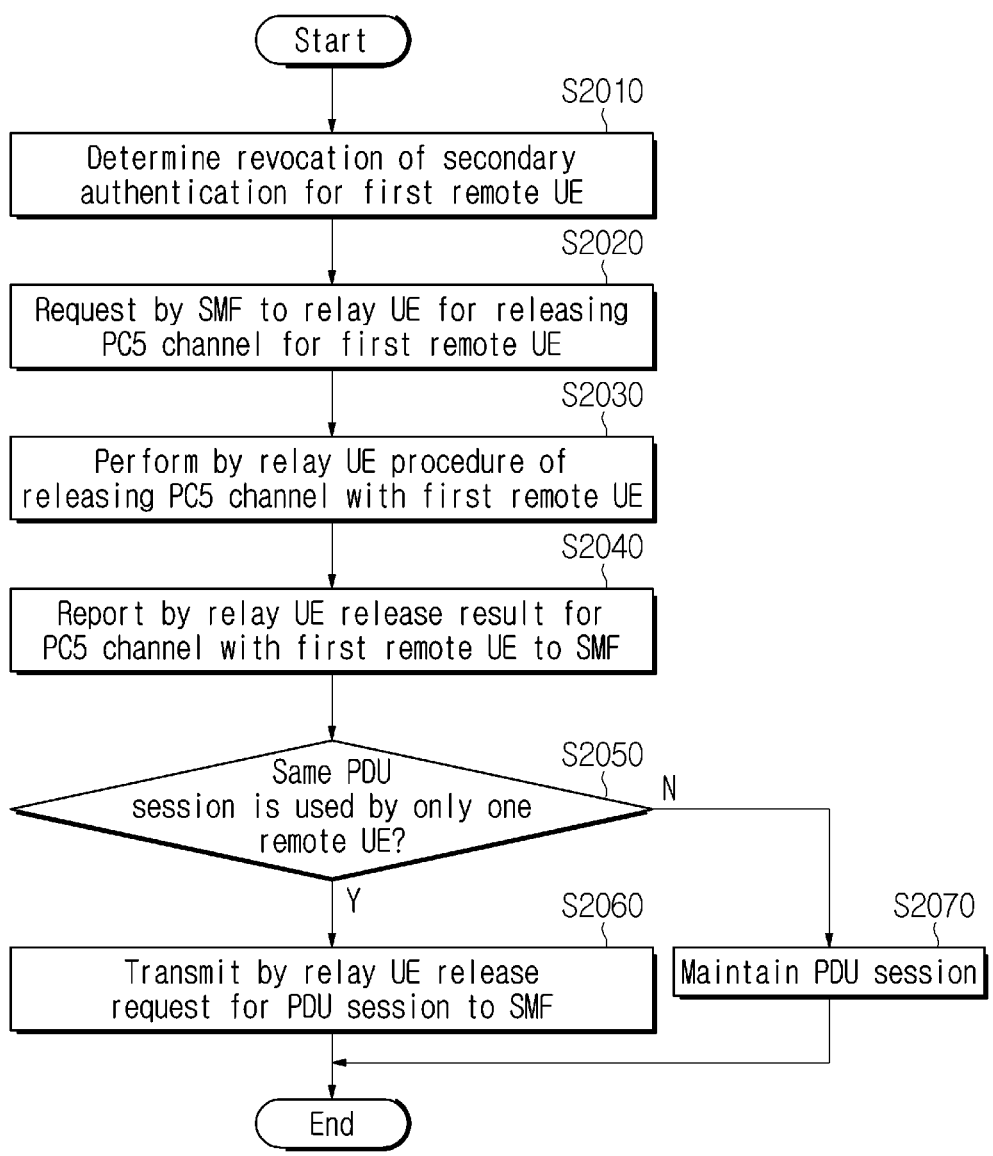
FIG. 20 is a view illustrating a method for performing a secondary authentication revocation procedure based on SMF according to an embodiment of the present disclosure.

FIG. 20 is a view illustrating a method for performing a secondary authentication revocation procedure based on SMF according to an embodiment of the present disclosure.

Referring to FIG. 20, secondary authentication revocation for a first remote UE may be determined (S2010). As an example, the first remote UE may be a specific remote UE among a plurality of remote UEs. The secondary authentication revocation for the first remote UE may be determined based on a predetermined condition and is not limited to a specific cause. Herein, as an example, the secondary authentication revocation for the first remote UE may be determined by a SMF.

As a concrete example, in case the first remote UE leaves a communication-permitted zone, secondary authentication may be revoked. As another example, in case an access UPF for transmitting user plane data is reconfigured, secondary authentication may be revoked. As another example, in case RAN fails to allocate a PDU session resource in a mobility situation, secondary authentication may be revoked.

As another example, the secondary authentication revocation for the first remote UE may be determined by a request of DN-AAA. As a concrete example, in case the validity period of qualification used for secondary authentication between an external DN-AAA and the first remote UE has expired, a revocation request for revoking the secondary authentication may be executed. In addition, as an example, a qualification operating regulation of a DN-AAA is modified, a secondary authentication revocation request may be executed, but may not limited thereto.

Next, PDU session and PC5 channel release may be performed based on secondary authentication revocation of a remote UE. Herein, a subject determining the number of remote UEs using a PDU session of a same relay UE may be different. As an example, the number of remote UEs using a PDU session of a same relay UE may be determined by the relay UE. That is, based on determination of secondary authentication revocation for the first remote UE, the relay UE may determine whether or not only the first remote UE uses a same PDU session of the relay UE. Herein, the SMF may request the relay UE only to release a PC5 channel with the first remote UE for which secondary authentication is revoked (S2020). Herein, a message sent from the SMF to the relay UE may be described as in Table 4 above. A PC5 channel release request message may include a remote UE ID for specifying the remote UE and a release cause value. Herein, the release cause may indicate the revocation of secondary authentication for the remote UE. Next, the relay UE may perform a procedure of releasing the PC5 channel with the first remote UE, which is requested from the SMF (S2030). Herein, the PC5 channel release request message may include the release cause value delivered from the SMF. In case PC5 channel release between the remote UE and the relay UE is completed, the relay UE may report a release result for the PC5 channel with the remote UE to the SMF through a NAS message, which is ordered (S2040). Next, the relay UE may determine whether to maintain or release a PDU session of the relay UE for a relay service. As an example, in case no other remote UE than the first remote UE uses the PDU session or no further reuse is necessary (S2050), the relay UE may request the SMF to release the PDU session (S2060). In case the relay requests to release the PDU session, the SMF may perform a PDU session release operation or reject the request. As an example, in case the SMF is basically set to always maintain a default PDU session for a relay service, the SMF may reject the PDU session release request of the relay UE but may not be limited thereto.

On the other hand, in case another remote UE different from the first remote UE additionally uses the PDU session (S2050), the relay UE may maintain the PDU session of an existing relay UE and thus ensure a relay service of the another remote UE (S2070).

Figure 21:
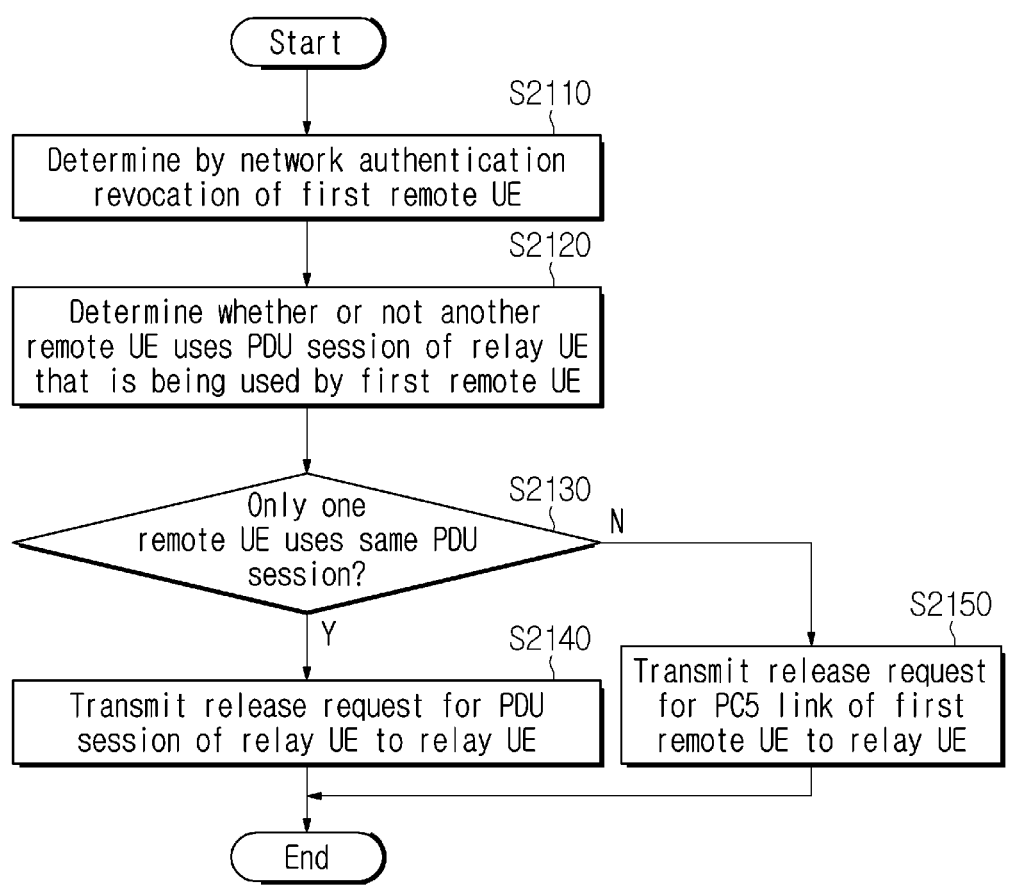
FIG. 21 is a flowchart illustrating a method for revoking secondary authentication according to an embodiment of the present disclosure.

FIG. 21 is a flowchart illustrating a method for revoking secondary authentication according to an embodiment of the present disclosure.

Referring to FIG. 21, a network may determine authentication revocation of a first remote UE (S2110). Herein, the network may determine whether or not another remote UE uses a PDU session of a relay UE that the first remote UE uses (S2120). Herein, in case no other remote UE uses the PDU session of the relay UE which is used by the first remote UE (S2130), the network may transmit a request for releasing the PDU session of the relay UE to the relay UE (S2140). On the other hand, in case another remote UE uses the PDU session of the relay UE which is used by the first remote UE (S2130), the network may transmit a request for releasing a PC5 link of the first remote UE to the relay UE (S2150).

Herein, as an example, the authentication revocation of the first remote UE may be determined by the SMF or a DN-AAA, as described above. In case the authentication revocation of the first remote UE is determined based on the DN-AAA, the SMF may receive an authentication revocation request message for the first remote UE from the DN-AAA. Next, the SMF may determine the authentication revocation of the first remote UE.

In addition, as an example, the network may perform authentication for at least one remote UE through a relay UE. Herein, the network may obtain identification information and relevant information for at least one or more remote UEs respectively through the relay UE. Thus, the network may determine whether or not there is any other remote UE than the first remote UE which uses a PDU session of the relay UE.

In addition, as an example, in case the network transmits a PDU session release request of the relay UE, the PDU session release request of the relay UE may include a release cause value, and the release cause value may indicate authentication revocation for the first remote UE. The relay UE may perform a PC5 release procedure with the first remote UE based on the PDU session release request of the relay UE, release the PDU session and report the completion of the PDU session to the network.

On the other hand, in case the network transmits a PC5 link release request of the first remote UE to the relay UE, the PC5 link release request of the first remote UE may include identification information of the first remote UE and a release cause value indicating the authentication revocation of the first remote UE. The relay UE may perform a procedure of releasing a PC5 link with the first remote UE based on the identification information of the first remote UE and report the completion of releasing the PC5 link with the first remote UE to the network, as described above.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

What is claimed is:

1. A method comprising:
    receiving, by a session management function (SMF), information of a first remote user equipment for a packet data unit (PDU) session of relay user equipment from the relay user equipment;
    determining, by the SMF, revocation of authentication of the first remote user equipment;
    determining, by the SMF, whether another remote user equipment uses the PDU session of the relay user equipment used by the first remote user equipment; and
    based on a result of the determining whether the another remote user equipment uses the PDU session, transmitting, by the SMF, a release request for a PDU session of a relay user equipment or a release request for a PC5 link of the first remote user equipment to the relay user equipment,
    wherein the release request for a PDU session of the relay user equipment is transmitted based on the PDU session of the relay user equipment being used only by the first remote user equipment, and
    wherein the release request for a PC5 link of the first remote user equipment is transmitted based on the PDU session of the relay user equipment being used by the another user equipment.

2. The method of claim 1, wherein the revocation of authentication of the first remote user equipment is determined by data network-authentication, authorization and accounting (DN-AAA).

3. The method of claim 2, wherein, based on the revocation of authentication of the first remote user equipment being determined based on the DN-AAA, the SMF receives an authentication revocation request message for the first remote user equipment from the DN-AAA.

4. The method of claim 1, wherein, based on the SMF performing authentication for at least one remote user equipment through the relay user equipment, the SMF obtains identification information and relevant information on each of the at least one remote user equipment through the relay user equipment.

5. The method of claim 4, wherein the SMF determines whether the another remote user equipment different from the first remote user equipment uses the PDU session of the relay user equipment, based on the identification information and the relevant information on the each of the at least one remote user equipment.

6. The method of claim 1, wherein, based on the SMF transmitting the release request for the PDU session of the relay user equipment, the release request for the PDU session of the relay user equipment includes a release cause value, and
    wherein the release cause value indicates authentication revocation for the first remote user equipment.

7. The method of claim 6, wherein, based on the release request for the PDU session of the relay user equipment, the relay user equipment performs a procedure of releasing the PC5 link with the first remote user equipment, releases the PDU session and reports PDU session release completion to a network.

8. The method of claim 1, wherein, based on the SMF transmitting the release request for the PC5 link of the first remote user equipment to the relay user equipment, the release request for the PC5 link of the first remote user equipment includes identification information of the first remote user equipment and a release cause value indicating the authentication revocation of the first remote user equipment.

9. The method of claim 8, wherein the relay user equipment performs a procedure for releasing the PC5 link with the first remote user equipment based on the identification information of the first remote user equipment and reports PC5 link release completion of the first remote user equipment to the SMF.

10. A session management function (SMF) comprising:
    at least one transceiver; and
    at least one processor connected to the at least one transceiver,
    wherein the at least one processor is configured to:
    control the at least one transceiver to receive information of a first remote user equipment for a packet data unit (PDU) session of relay user equipment from the relay user equipment;
    determine authentication revocation of the first remote user equipment,
    determine whether another remote user equipment uses the PDU session of the relay user equipment used by the first remote user equipment, and
    control the at least one transceiver to transmit a release request for the PDU session of the relay user equipment or a release request for a PC5 link of the first remote user equipment to a relay user equipment based on the determination result,
    wherein the release request for a PDU session of the relay user equipment is transmitted based on the PDU session of the relay user equipment being used only by the first remote user equipment, and
    wherein the release request for a PC5 link of the first remote user equipment is transmitted based on the PDU session of the relay user equipment being used by the another user equipment.

11. A method comprising:
    transmitting, by a relay user equipment, information of a first remote user equipment for a packet data unit (PDU) session of the relay user equipment to a session management function (SMF);
    receiving, from the SMF, a release request for the PDU session of the relay user equipment or a release request for a PC5 link of the first remote user equipment; and
    performing a procedure of releasing the PC5 link with the first remote user equipment based on the release request for the PDU session of the relay user equipment or the release request for the PC5 link of the first remote user equipment,
    wherein authentication revocation of the first remote user equipment is determined based on the SMF,
    wherein the release request for a PDU session of the relay user equipment is received based on the PDU session of the relay user equipment being used only by the first remote user equipment, and wherein the release request for a PC5 link of the first remote user equipment is received based on the PDU session of the relay user equipment being used by the another user equipment.

12. A relay user equipment comprising:
at least one transceiver; and
at least one processor connected to the at least one transceiver,
wherein the at least one processor is configured to:
   control the transceiver to transmit information of a first remote user equipment for a packet data unit (PDU) session of the relay user equipment to a session management function (SMF),
   control the transceiver to receive, from the SMF, a release request for the PDU session of the relay user equipment or a release request for a PC5 link of the first remote user equipment, and
   perform a procedure of releasing the PC5 link with the first remote user equipment based on the release request for the PDU session of the relay user equipment or the release request for the PC5 link of the first remote user equipment, and
wherein authentication revocation of the first remote user equipment is determined based on a network, and
wherein the release request for a PDU session of the relay user equipment is received based on the PDU session of the relay user equipment being used only by the first remote user equipment, and
wherein the release request for a PC5 link of the first remote user equipment is received based on the PDU session of the relay user equipment being used by the another user equipment.

* * * * *